US012559017B2

(12) United States Patent
Hoff et al.

(10) Patent No.: US 12,559,017 B2
(45) Date of Patent: Feb. 24, 2026

(54) SYSTEMS AND METHODS FOR DETERMINING A VEHICLE RIGGING SETUP

(71) Applicant: Oshkosh Corporation, Oshkosh, WI (US)

(72) Inventors: David Hoff, Oshkosh, WI (US); Todd Werner, Oshkosh, WI (US); Sanjeev Kuriakose, Shippenburg, PA (US)

(73) Assignee: OSHKOSH CORPORATION, Oshkosh, WI (US)

( * ) Notice: Subject to any disclaimer, the term of this patent is extended or adjusted under 35 U.S.C. 154(b) by 747 days.

(21) Appl. No.: 17/954,904

(22) Filed: Sep. 28, 2022

(65) Prior Publication Data

US 2023/0097527 A1      Mar. 30, 2023

Related U.S. Application Data

(60) Provisional application No. 63/250,528, filed on Sep. 30, 2021.

(51) Int. Cl.
B60P 3/12      (2006.01)
B66C 23/42      (2006.01)
B66C 23/90      (2006.01)

(52) U.S. Cl.
CPC .............. B60P 3/12 (2013.01); B66C 23/42 (2013.01); B66C 23/905 (2013.01)

(58) Field of Classification Search
CPC ......... B60P 3/12; B66C 23/42; B66C 23/905; B66C 13/44; B66C 23/36
See application file for complete search history.

(56) References Cited

U.S. PATENT DOCUMENTS

| | | | | |
|---|---|---|---|---|
| 4,178,591 A * | 12/1979 | Geppert | ............... | B66C 23/905 |
| | | | | 340/685 |
| 6,651,961 B1 * | 11/2003 | Meyer | ..................... | B66D 3/06 |
| | | | | 254/285 |
| 9,223,008 B1 * | 12/2015 | Hartman | ............... | B66C 13/085 |
| 11,440,516 B2 * | 9/2022 | Kulkarni | ............. | H01M 4/8896 |
| 11,565,619 B1 * | 1/2023 | Kresge | ................... | B60P 3/125 |
| 2006/0087152 A1 * | 4/2006 | Kuriakose | .......... | B62D 25/2054 |
| | | | | 296/184.1 |
| 2009/0263222 A1 * | 10/2009 | Kuriakose | ................. | B60P 3/12 |
| | | | | 414/563 |

(Continued)

*Primary Examiner* — Michael Collins

(74) *Attorney, Agent, or Firm* — FOLEY & LARDNER LLP

(57)      ABSTRACT

A wrecker vehicle includes a chassis, a boom coupled with the chassis, and a hoist device coupled with the chassis, the hoist device configured to engage a line to position a piece of equipment relative to the chassis. The vehicle may also include a controller configured to receive rigging setup data. The controller may further determine a first utilization state, wherein the first utilization state is a line load utilization state of the line, and a second utilization state, wherein the second utilization state is a first block load utilization state of a first sheave block. Further, the controller may be configured to determine, based on a comparison of the first utilization state to a first threshold and the second utilization state to a second threshold, a rigging setup state, and provide an indication of the rigging setup state.

20 Claims, 13 Drawing Sheets

(56) References Cited

U.S. PATENT DOCUMENTS

| 2009/0285662 A1* | 11/2009 | Addleman | ............... B60P 3/12 |
| | | | 414/563 |
| 2019/0031474 A1* | 1/2019 | Stilborn | ................. B66C 23/00 |
| 2021/0269287 A1* | 9/2021 | Iwazawa | ................. B66C 23/34 |

* cited by examiner

1100

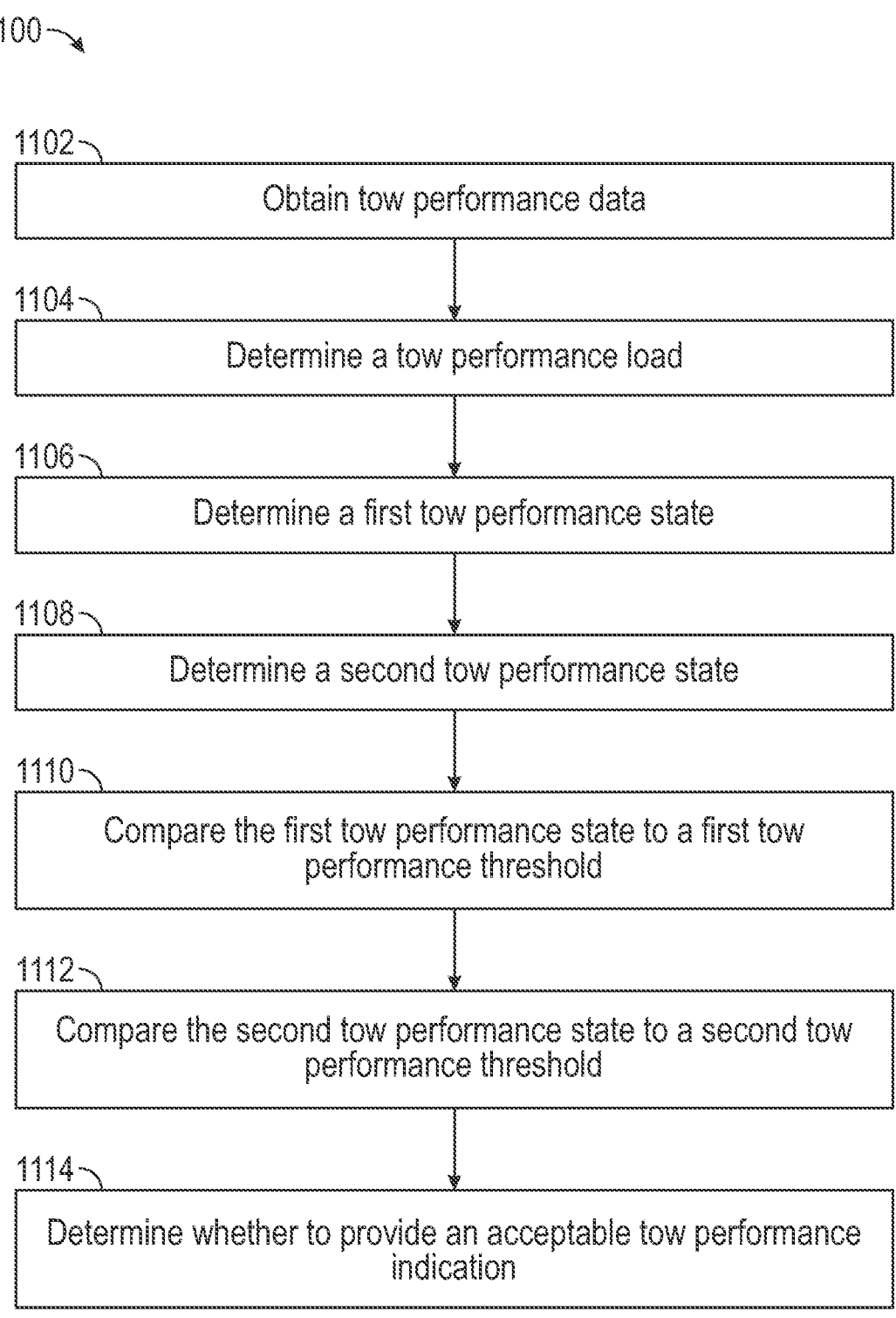

1102
Obtain tow performance data

1104
Determine a tow performance load

1106
Determine a first tow performance state

1108
Determine a second tow performance state

1110
Compare the first tow performance state to a first tow performance threshold 1112
Compare the second tow performance state to a second tow performance threshold 1114
Determine whether to provide an acceptable tow performance indication

FIG. 11

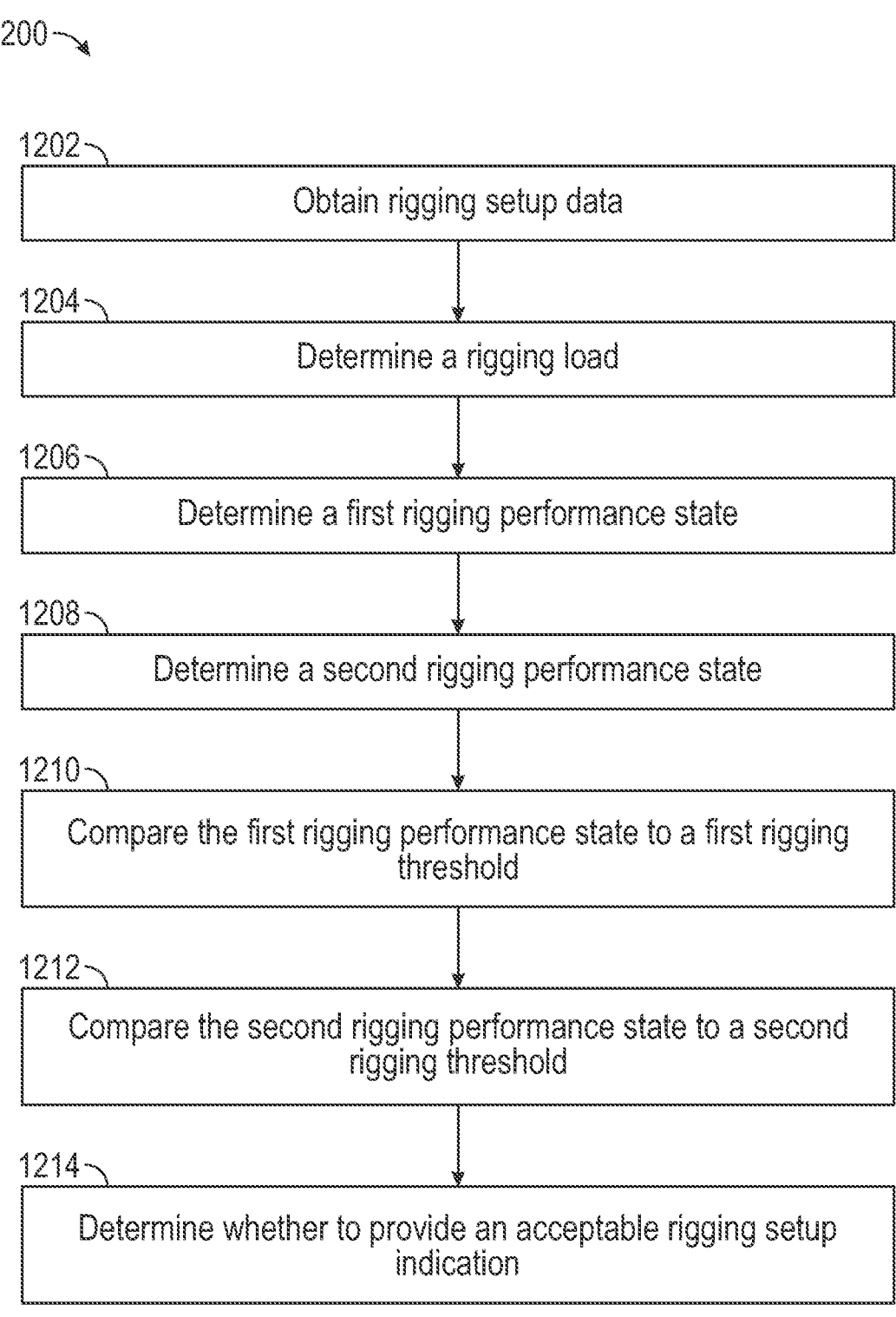

1200

1202 — Obtain rigging setup data

1204 — Determine a rigging load

1206 — Determine a first rigging performance state

1208 — Determine a second rigging performance state

1210 — Compare the first rigging performance state to a first rigging threshold

1212 — Compare the second rigging performance state to a second rigging threshold 1214 — Determine whether to provide an acceptable rigging setup indication

FIG. 12

SYSTEMS AND METHODS FOR DETERMINING A VEHICLE RIGGING SETUP

CROSS-REFERENCE TO RELATED PATENT APPLICATIONS

This patent application claims the benefit of and priority to U.S. Provisional Patent Application No. 63/250,528, filed on Sep. 30, 2021, which is hereby incorporated by reference herein.

BACKGROUND

This disclosure relates generally to a tow performance vehicle, and more specifically systems and methods for organizing a tow performance vehicle with a rigging setup.

SUMMARY

One exemplary embodiment relates to a wrecker vehicle. The wrecker vehicle comprising a chassis having a frame, the chassis coupled with a plurality of wheels. The wrecker vehicle also includes a boom coupled with the chassis, the boom having a line configured to engage one or more sheave blocks to position a piece of equipment relative to the chassis, and a hoist device coupled with the chassis, the hoist device configured to engage the line to position the piece of equipment relative to the chassis. The wrecker vehicle may also include a controller configured to receive rigging setup data relating to at least one of a configuration of the boom, a characteristic of the line, or a characteristic of the piece of equipment, and determine a rigging load based on the rigging setup data. The controller may further be configured to determine a first utilization state based on the rigging load, wherein the first utilization state is a line load utilization state of the line, and determine a second utilization state based on the rigging load, wherein the second utilization state is a first block load utilization state of a first sheave block. Further, the controller may be configured to determine, based on a comparison of the first utilization state to a first threshold and the second utilization state to a second threshold, a rigging setup state, and provide an indication of the rigging setup state.

Another exemplary embodiment relates to a wrecker vehicle monitoring system. The wrecker vehicle monitoring system may comprise one or more processing circuits comprising one or more memory devices coupled to one or more processors, the one or more memory devices configured to store instructions thereon that, when executed by the one or more processors, cause the one or more processors to perform operations. The operations of the one or more processors may comprise receiving rigging setup data relating to at least one of a configuration of a boom, a characteristic of a line, or a characteristic of a piece of equipment, and determining a rigging load based on the rigging setup data. The operations of the one or more processors may further comprise determining a first utilization state based on the rigging load, wherein the first utilization state is a line load utilization state of the line, and determining a second utilization state based on the rigging load, wherein the second utilization state is a first block load utilization state of a first sheave block. Further, the operations may include determining, based on a comparison the first utilization state to a first threshold and the second utilization state to a second threshold, a rigging setup state, and providing an indication of the rigging setup state.

Another exemplary embodiment relates to a method. The method may comprise receiving rigging setup data, the rigging setup data relating to at least one of a configuration of a boom, a characteristic of a line, or a characteristics of a piece of equipment, and determining a rigging load based on the rigging setup data. The method may further include determining a first utilization state based on the rigging load, wherein the first utilization state is a line load utilization state of the line, and determining a second utilization state based on the rigging load, wherein the second utilization state is a first block load utilization state of a first sheave block. Further, the method can include determining, based on a comparison of the first utilization state to a first threshold and the second utilization state to a second threshold, a rigging setup state, and providing an indication of the rigging setup state.

Another embodiment relates to a towing vehicle. The towing vehicle can comprise a plurality of vehicle components, and a vehicle monitoring system. The vehicle monitoring system may include a controller configured to receive tow performance data, and determine a tow performance load based on the tow performance data. The controller may further be configured to determine a first tow performance state based on the tow performance data, where the first tow performance state is a steer axle utilization state, and determine a second tow performance state based on the tow performance data, where the second tow performance state is a drive axle utilization state. Further, the controller may be configured to determine, based on a comparison of the first tow performance state to a first tow performance threshold and the second tow performance state to a second tow performance threshold, a tow performance state, and provide an indication of the tow performance state.

The disclosure is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 11 is a flow diagram of a process for providing a tow performance, according to an exemplary embodiment.

FIG. 12 is a flow diagram of a process for providing a rigging setup, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle monitoring system includes an interface that is configured to provide tow performance information for configuring and/or monitoring a vehicle during towing. In another exemplary embodiment, a vehicle monitoring system includes an interface that is configured to provide rigging setup information for configuring and/or monitoring a vehicle during rigging.

Figure 1:
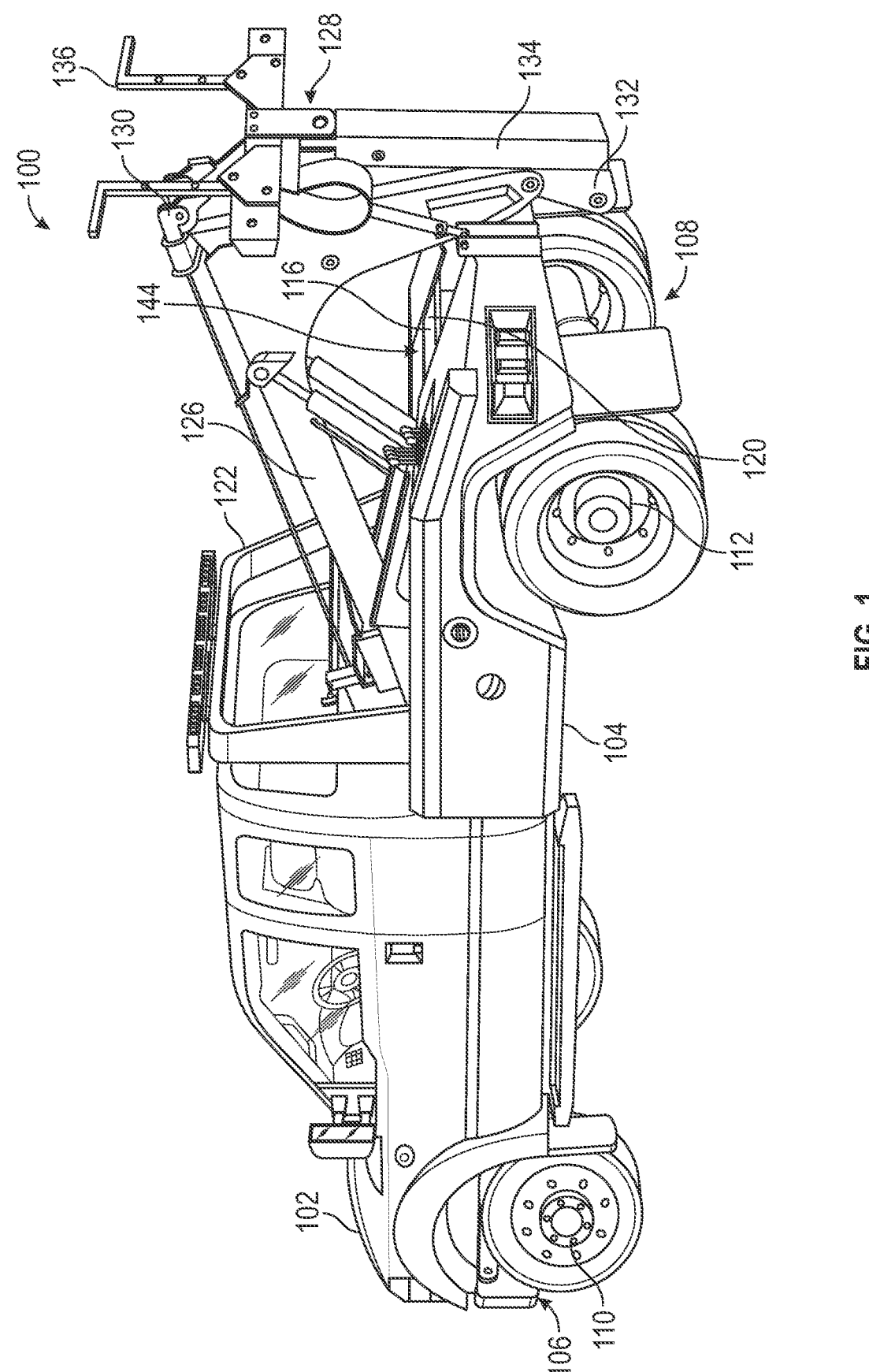
FIG. 1 is a side plain view of a wrecker truck, according to an exemplary embodiment.

According to the exemplary embodiment shown in FIG. 1, a vehicle is shown. In an exemplary embodiment, the vehicle is a wrecker truck 100; however, in some embodiments the wrecker truck 100 is another suitable vehicle (e.g., a rotary tow truck, a carrier truck, a rescue truck, a military vehicle, a commercial truck, etc.). As shown in FIG. 1, the wrecker truck 100 includes a body, shown as cab 102 and a chassis, shown as a frame 104. The cab 102 may include a seat and an enclosure to facilitate operation of the wrecker truck 100 by a user. In some embodiments, the cab 102 further includes other components utilized by the user during operation of the wrecker truck 100 (e.g., a steering wheel, pedals, hydraulic controls, switches, levers, buttons, gauges, a control system, a user interface, etc.). Also according to an exemplary embodiment, the frame 104 includes a first frame member and a second frame member arranged in parallel. The first and the second frame members may extend along a longitudinal direction (e.g., a forward and a backward direction) between a truck front end 106 (e.g., a forward portion of the wrecker truck 100 proximate to the cab 102) and a truck rear end 108 (e.g., a rearward portion of the wrecker truck 100). A centerline of the wrecker truck 100 extends parallel to the longitudinal direction between the first frame member and the second frame member. According to an exemplary embodiment, the first frame member and the second frame member are elongated structural members (e.g., a beam, channel, tubing, extrusion, etc.). The first frame member and the second frame member may be laterally spaced, and define a cavity or void therebetween. In this regard, the cavity may provide an area for effectively concealing or otherwise mounting certain components of the wrecker truck 100. According to an exemplary embodiment, the frame 104 includes and/or supports additional components utilized by the user during operation of the wrecker truck 100 (e.g., a counterweight assembly, a deployable warning assembly, etc.).

As shown in FIG. 1, in an exemplary embodiment a plurality of wheels are rotatably coupled to the frame 104. According to an exemplary embodiment, the wrecker truck 100 includes six wheels, for example a single wheel axle set 110 at the truck front end 106 and a dual wheel axle set 112 at the truck rear end 108. The single wheel axle set 110 at the truck front end 106 may be steerable (e.g., via a steering wheel, control system, user interface, user application, etc.), while the dual wheel axle set 112 at the truck rear end 108 may be configured to be driven (e.g., by an engine, a motor, via a control system, user interface, user application, etc.). It should be appreciated that the wrecker truck 100 may have any number of suitable wheel configurations, including single axle sets, dual axel sets, triple axel sets, with four, eight, eighteen, and/or any other suitable number of wheels.

Also shown in FIG. 1, in an exemplary embodiment the wrecker truck 100 includes a bed assembly, shown as a platform 114. According to an exemplary embodiment, the platform 114 includes a bed surface 116, a platform forward end 118, and a platform rear end 120. In an exemplary embodiment, the platform 114 is movably coupled to the frame 104, and is configured to support a vehicle. The platform 114 may be movable via a hydraulic system (e.g., controlled from the cab 102, a control panel provided on and/or in the wrecker truck 100, etc.) and/or a control system (e.g., a controller provided on and/or in the carrier truck 300, via a user interface, user application, etc.). In some embodiments, the platform rear end 120 is slopped, for example to provide a position for a vehicle to rest on the platform 114.

As shown in FIG. 1, in an exemplary embodiment the platform 114 includes a platform headboard 122 including an aperture, shown as opening 124, the platform headboard 122 coupled to the platform 114 (e.g., the platform forward end 118). According to an exemplary embodiment, the wrecker truck 100 also includes a support, shown as boom 126, and a lift, shown as cross bar 128. The boom 126 may be movably coupled to the frame 104 (e.g., the platform 114) and extendable, and may also include a redirect, shown as snatch block 130. The snatch block 130 may be rotatably coupled to the boom 126, and may include a single sheave wheel, dual sheave wheels, and/or any number of suitable sheave wheels. It should be appreciated that the boom 126 may include a single snatch block 130, dual snatch blocks 130, and/or any number of suitable snatch block(s) 130. Similar to the platform 114, in an exemplary embodiment the boom 126 and/or the snatch block 130 is/are controlled via a hydraulic system (e.g., controlled from the cab 102, a control panel, etc.) and/or a control system (e.g., a controller, via a user interface, user application, etc.).

Also shown in FIG. 1, in an exemplary embodiment the cross bar 128 includes a stop, shown as level stop 132, a support, shown as tilt arm 134, and a receiver, shown as self-loader 136. According to an exemplary embodiment, the cross bar 128 (e.g., the tilt arm 134) is movably coupled to the boom 126 and/or the frame 104. The cross bar 128 (e.g., the tilt arm 134) may be movable via a hydraulic system, a control system, and/or any combination of suitable systems, as discussed above. The level stop 132 may include a hydraulic system and/or a control system, for example to control the position of the tilt arm 134 and the self-loader 136, such that the cross bar 128 is in a suitable position for loading a vehicle. In an exemplary embodiment, the self-loader 136 also includes a center locking mechanism and a lift system for attachment and positioning of a vehicle. For example, the self-loader 136 may include a hydraulic system, a manual lift system, a wheel lift system, and/or any other suitable system for attaching and/or positioning the vehicle.

Figure 2:
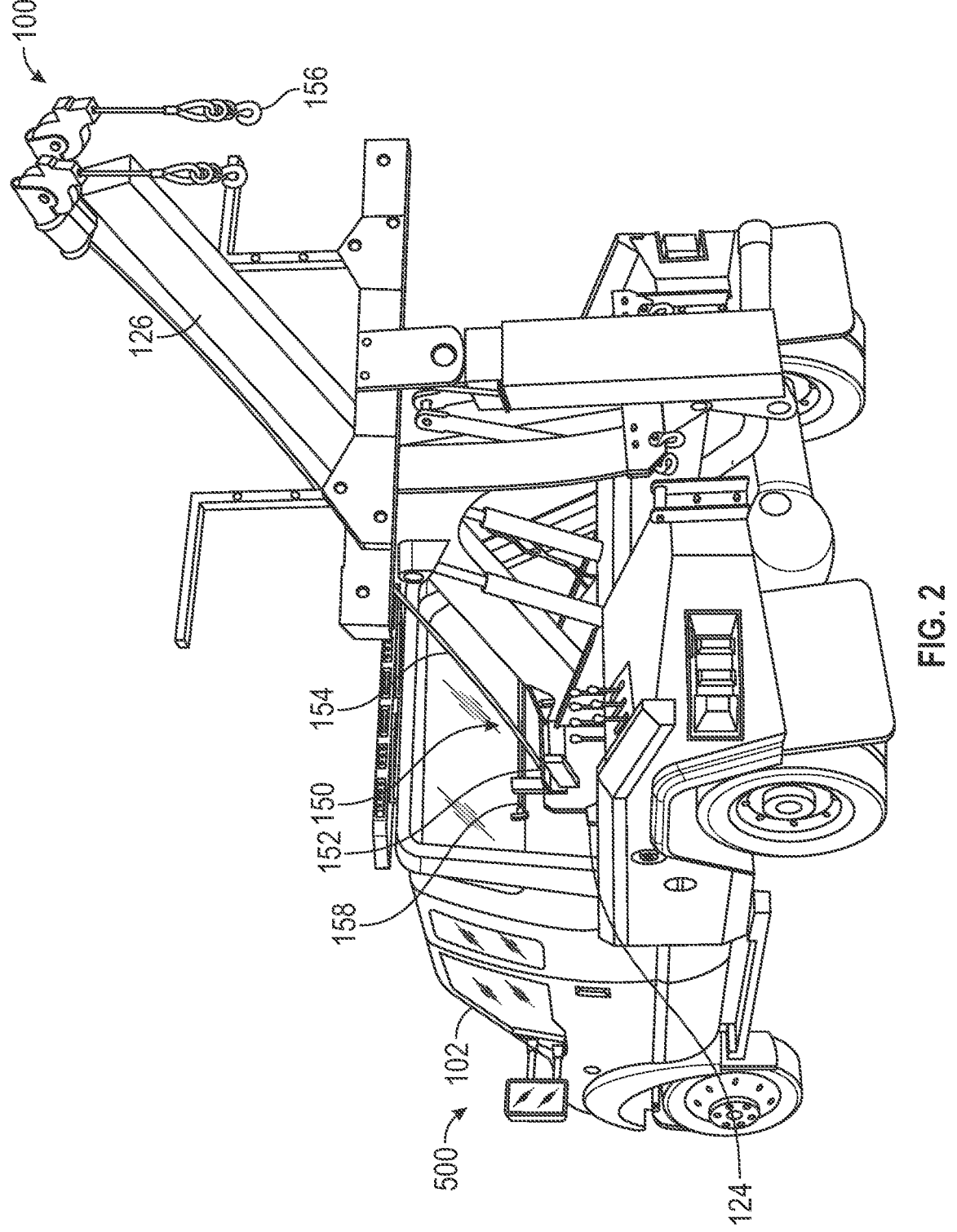
FIG. 2 is a rear perspective view of a wrecker truck, according to an exemplary embodiment.

According to the exemplary embodiment shown in FIG. 2, the wrecker truck 100 includes the boom 126 in an extended position. As discussed above, the boom 126 may expand to an extended position (via a hydraulic system, a control system, etc.) to better position the boom 126 for use. As shown in FIG. 2, the wrecker truck 100 includes a hoist device, shown as winch 150, which may be configured to pull an object onto the platform 114 and/or the cross bar 128. For example, the winch 150 may be used to pull a vehicle (e.g., an automobile, a tractor, construction vehicle, recreational vehicle, etc.), equipment (e.g., construction equipment, agricultural equipment, etc.), and/or any other suitable object onto the platform 114 and/or the cross bar 128.

As shown in FIG. 2, according to an exemplary embodiment the winch 150 includes a spool 152, a line 154 (e.g., wire rope, synthetic rope, cable, etc.), and an interface element, shown as hook 156. According to an exemplary embodiment, the winch 150 is coupled to at least one of the platform 114, the platform headboard 122, and/or the frame 104. In this regard, the platform headboard 122 may include an aperture, shown as opening 124, in which at least one of the winch 150 and/or the mechanism for the winch 150 may be positioned. According to an exemplary embodiment, the opening 124 is sized to accommodate different types and/or models of the winch 150, different winch free spool devices, and/or other components of the wrecker truck 100. It should be appreciated that in other embodiments, the winch 150 is coupled to still other components of the wrecker truck 100, and/or may be positioned in different locations at the wrecker truck 100.

In an exemplary embodiment, the spool 152 is rotatably coupled to a drive mechanism (e.g., a hydraulic drive mechanism, an electronic drive mechanism, etc.), which may be controlled by a control system (e.g., a hydraulic system, a control panel on and/or in the wrecker truck 100, a controller, a user interface, a user application, etc.). Also in an exemplary embodiment, the line 154 is wound around the spool 152, and a free end of the line 154 is coupled to the hook 156. As shown in FIG. 2, the line 154 extends along the boom 126, is in communication with the snatch block 130, and couples to the hook 156. In an exemplary embodiment, the line 154 communicates with a single sheave wheel, multiple sheave wheels, and/or any number of suitable sheave wheels, either inside or outside, the snatch block(s) 130. It should be appreciated that the winch 150 may be suitable for a plurality of lines 154, and the wrecker truck 100 (e.g., the boom 126) may be suitable for a plurality of lines 154, snatch block(s) 130, and/or hooks 156. Also in an exemplary embodiment, tie downs (e.g., chains, cables, straps, etc.) are also be used to secure the object and/or vehicle to the platform 114 (e.g., during transit, etc.).

As shown in FIG. 2, in an exemplary embodiment the winch 150 includes a winch free spool device, shown as a clutch 158. In an exemplary embodiment, the clutch 158 couples and/or decouples the spool 152 with the drive mechanism and/or an intermediate gear train of the winch 150. The clutch 158 may selectively allow the line 154 to freely unwind from the spool 152 without needing to power the winch 150. According to an exemplary embodiment, the clutch 158 conserves energy and reduces wear on the winch 150 by reducing use of the winch drive mechanism. The clutch 158 may also reduce the time required to extend the line 154 (e.g., a user may pull the line 154 from the spool 152 faster than unwinding the line 154 with the winch drive mechanism, etc.). In an exemplary embodiment, the clutch 158 is configured to be activated and/or deactivated, for example via a user input (e.g., manipulation of a button, switch, lever, rod, actuation assembly, etc.), a control system (e.g., a controller provided on and/or in the wrecker truck 100, via a user interface, a user application, etc.), and/or any other suitable mechanism.

Referring still to FIG. 2, in an exemplary embodiment the wrecker truck 100 also includes a vehicle monitoring system (VMS) 500. In an exemplary embodiment, the VMS 500 is configured to monitor the status of various components of the wrecker truck 100 (e.g., the platform 114, the wheels, the boom 126, the cross bar 128, the snatch blocks 130, the winch 150, the line 154, the hooks 156, etc.). The VMS 500 may be configured to monitor, analyze, and/or process inputs from the various components of the wrecker truck 100. In some embodiments, the VMS 500 is configured to analyze, process and/or send outputs to various components of the wrecker truck 100 and/or other suitable devices, as discussed below. It should be understood that in other embodiments the wrecker truck 100 also includes additional, fewer, and/or different working components.

Figure 3:
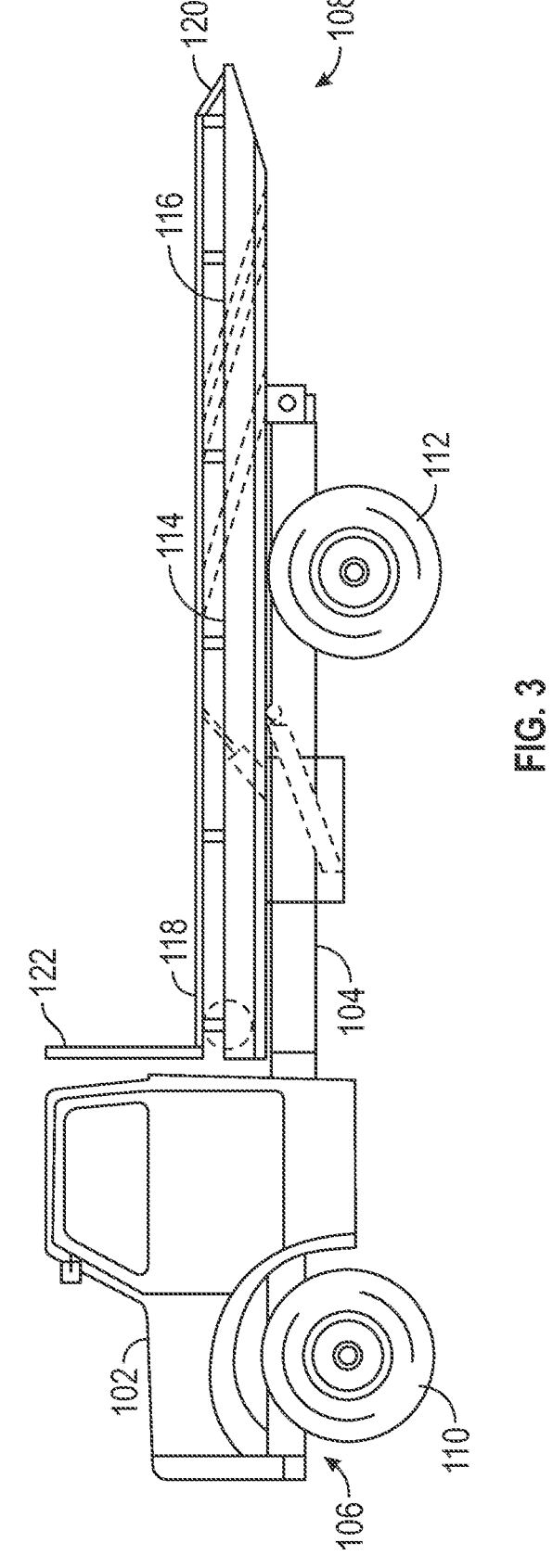
FIG. 3 is a side plain view of a carrier truck, according to an exemplary embodiment.

According to the exemplary embodiment shown in FIG. 3, another vehicle, shown as carrier truck 300, is shown. In an exemplary embodiment, the carrier truck 300 includes similar features as the vehicle described in FIGS. 1-2. For example, the carrier truck 300 may include the cab 102 and a chassis, shown as the frame 104. The cab 102 may be supported by the frame 104, and may include components utilized by a user during operation of the carrier truck 300 (e.g., a seat, enclosure, steering wheel, pedals, controls, gauges, a control system, a user interface, etc.). The frame 104 may include a first frame member and a second frame member between the truck front end 106 and the truck rear end 108, and may also include and/or support additional components utilized by the user during operation of the carrier truck 300 (e.g., a counterweight assembly, a deployable warning assembly, etc.).

As shown in FIG. 3, in an exemplary embodiment a plurality of wheels are rotatably coupled to the frame 104. According to an exemplary embodiment, the carrier truck 300 includes six wheels, for example a single wheel axle set 110 at the truck front end 106 and a dual wheel axle set 112 at the truck rear end 108. The single wheel axle set 110 may be steerable, while the dual wheel axle set 112 may be configured to be driven, as discussed above. However, it should be appreciated that the carrier truck 300 may have any number of suitable wheel configurations.

Also shown in FIG. 3, in an exemplary embodiment the carrier truck 300 includes a bed assembly, shown as the platform 114. The platform 114 may include the bed surface 116, the platform forward end 118, the platform rear end 120, and the platform headboard 122 coupled to the platform forward end 118. As discussed above, the platform 114 may be movably coupled to the frame 104, and may be configured to support a vehicle. For example, in an exemplary embodiment the platform 114 is movable between a loading position and a transport position. In this regard, in the loading position the bed surface 116 (e.g., the platform 114) may form an inclined ramp with the ground (e.g., to facilitate loading a vehicle onto the platform 114, etc.). In the transport position, the bed surface 116 (e.g., the platform 114) may be substantially parallel with the frame 104 (e.g., to facilitate transport of a vehicle by the carrier truck 300, etc.). In an exemplary embodiment, the platform 114 is movable via a hydraulic system; however, in some embodiments the platform 114 is movable via a control system (e.g., a controller, via a user interface, a user application, etc.), as discussed above.

Figure 4:
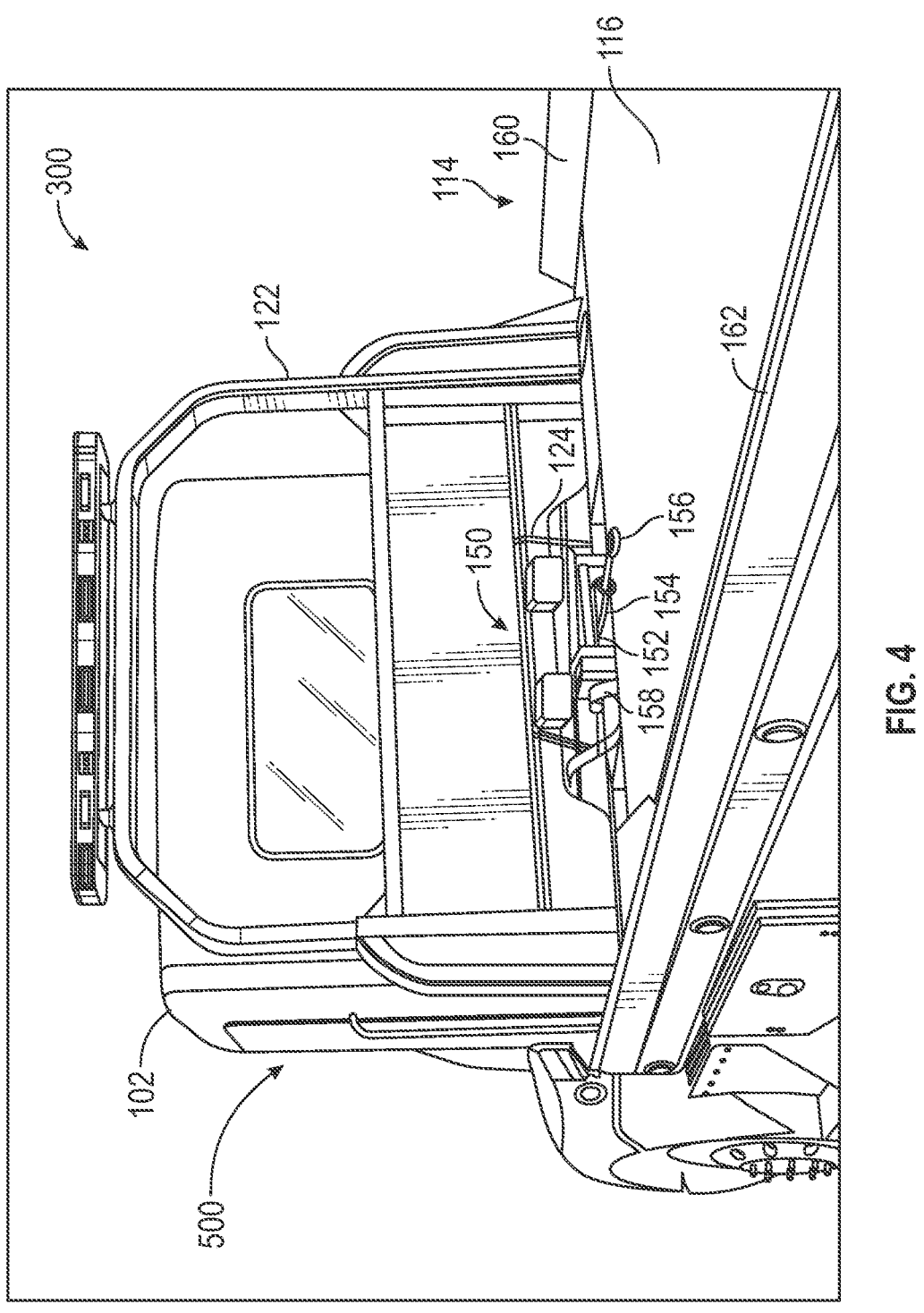
FIG. 4 is a rear perspective view of a carrier truck, according to an exemplary embodiment.

According to the exemplary embodiment shown in FIG. 4, the carrier truck 300 includes the winch 150, which is configured to pull an object onto the platform 114. For example, the winch 150 may be used to pull a vehicle (e.g., an automobile, a tractor, construction vehicle, recreational vehicle, etc.), equipment (e.g., construction equipment, agricultural equipment, etc.), and/or any other suitable object onto the platform 114.

As shown in FIG. 4, according to an exemplary embodiment the winch 150 includes the spool 152, the line 154 (e.g., wire rope, cable, etc.), and an interface element, shown as the hook 156. As discussed above, the winch 150 may be coupled to the platform 114, the platform headboard 122, the frame 104, and/or any other suitable component of the carrier truck 300. In an exemplary embodiment, the platform headboard 122 includes an aperture, shown as the opening 124, in which one of the winch 150 and/or the mechanism for the winch 150 is positioned. The spool 152 may be rotatably coupled to a drive mechanism, which may be controlled by a control system. In an exemplary embodiment, the line 154 is wound around the spool 152, and a free end of the line 154 is coupled to the hook 156. In some embodiments, tie downs (e.g., chains, cables, straps, etc.) are also be used to secure the object and/or vehicle to the platform 114 (e.g., during transit, etc.).

As shown in FIG. 4, in an exemplary embodiment the winch 150 also includes a winch free spool device, shown as the clutch 158. The clutch 158 may be configured to couple and/or decouple the spool 152 with the drive mechanism and/or an intermediate gear train of the winch 150, and/or selectively allow the line 154 to freely unwind from the spool 152 without needing to power the winch 150. In an exemplary embodiment, the clutch 158 is configured to be activated and/or deactivated, for example via a user input, a control system, a controller, a user application, and/or any other suitable mechanism, as discussed above.

Referring still to FIG. 4, in an exemplary embodiment the carrier truck 300 also includes a vehicle monitoring system (VMS) 500. In an exemplary embodiment, the VMS 500 is configured to monitor the status of various components of the carrier truck 300 (e.g., the platform 114, the wheels, the winch 150, the line 154, the hooks 156, etc.). The VMS 500 may be configured to monitor, analyze, and/or process inputs from the various components of the carrier truck 300. In some embodiments, the VMS 500 is configured to analyze, process and/or send outputs to various components of the carrier truck 300 and/or other suitable devices, as discussed below.

According to the exemplary embodiment shown in FIG. 5, a vehicle monitoring system, shown as vehicle monitoring system 500 (hereinafter "VMS 500"), is shown in greater detail. In some embodiments, some of the components of the VMS 500 are embodied in a vehicle (e.g., the wrecker truck 100, the carrier truck 300, and/or any other suitable vehicle, etc.), and/or are structured as one or more electronic control units (ECU). Further, some of the components of the VMS 500 may be separate from, or included in, the control units and/or control modules of a vehicle (e.g., the wrecker truck 100, the carrier truck 300, etc.). It should be understood that in other embodiments the carrier truck 300 also includes additional, fewer, and/or different working components.

Figure 5:
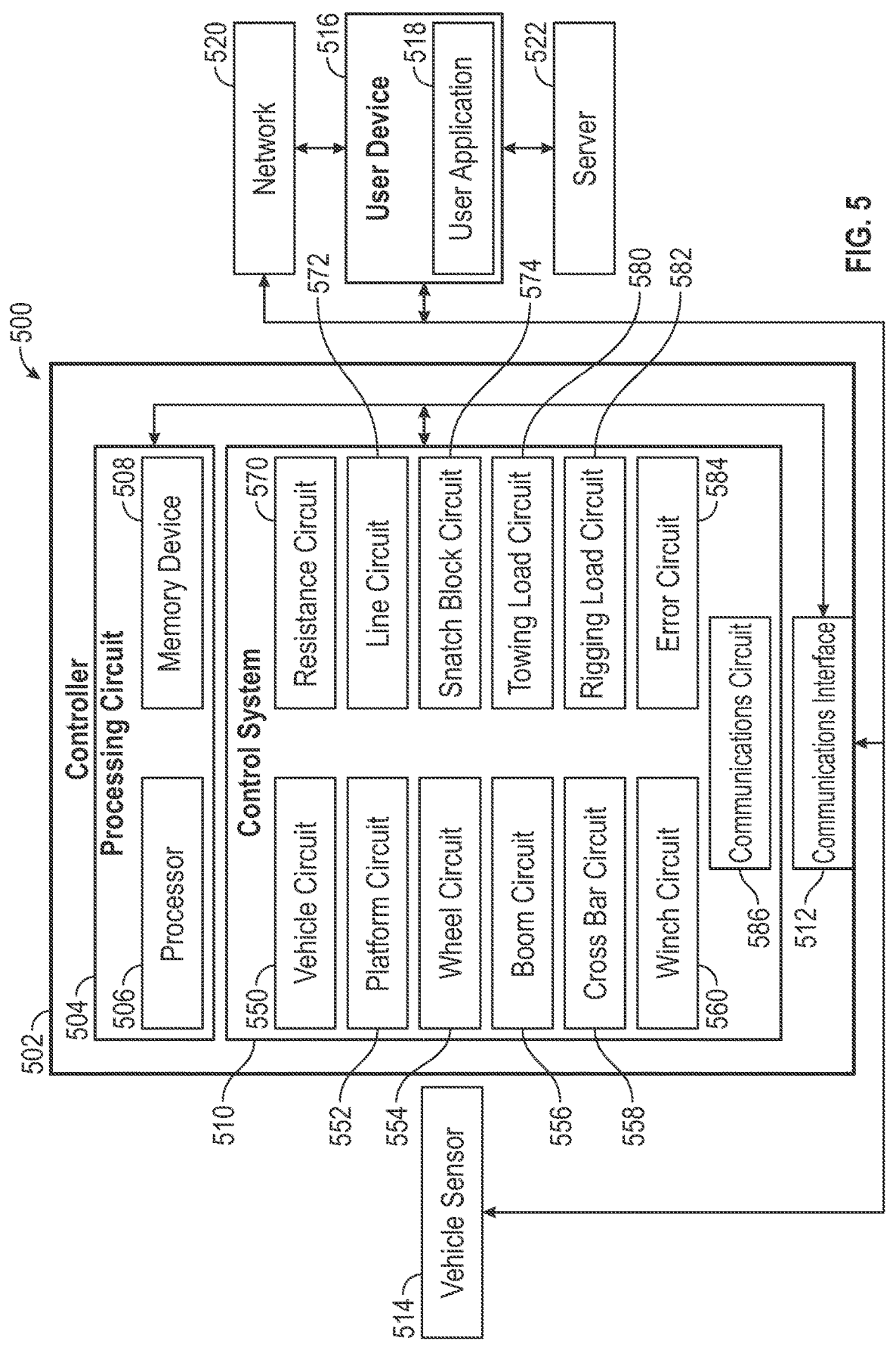
FIG. 5 is a block diagram of a vehicle monitoring system of the vehicles of FIGS. 1-4, according to an exemplary embodiment.

As shown in FIG. 5, the VMS 500 includes a controller 502 that is communicably coupled with one or more external sources. In an exemplary embodiment, the controller 502 includes a processing circuit 504, having a processor 506 and a memory device 508, a control system 510 (having a plurality of circuits), and a communications interface 512. In an exemplary embodiment, the communications interface 512 is communicably coupled to one or more external sources, for example a vehicle sensor 514, a user device 516 (including a user application 518), a network 520, and/or a server 522, such that the controller 502 and various components thereof send and/or receive data via the communications interface 512, as discussed below. Generally, the controller 502 is structured to receive, process, analyze, determine and/or send data relating to various components of a vehicle (e.g., the wrecker truck 100, the carrier truck 300, etc.).

As shown in FIG. 5, in an exemplary embodiment the controller 502 includes the processing circuit 504, having the processor 506 and the memory device 508. In an exemplary embodiment, the processing circuit 504 is structured and/or configured to execute or implement the instructions, commands, and/or control processes described herein with respect to the circuits (e.g., circuits 550-586) of the control system 510. The depicted configuration represents the circuits (e.g., circuits 550-586) of the control system 510 as machine or computer-readable media. However, this illustration is not meant to be limiting, as the present disclosure contemplates other embodiments where the circuits (e.g., circuits 550-586) of the control system 510, or at least one circuit, are/is configured as a hardware unit. All such combinations and variations are intended to fall within the scope of the present disclosure.

As shown in FIG. 5, in an exemplary embodiment the processing circuit 504 includes the processor 506. According to an exemplary embodiment, the hardware and data processing components used to implement the various processes, operations, illustrative logics, logical blocks, modules and circuits described in connection with the embodiments disclosed herein (e.g., the processor 506) are implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. In some embodiments, a general purpose processor is a microprocessor, or, any conventional processor, or state machine. In an exemplary embodiment, the processor 506 is also implemented as a combination of computing devices, such as a combination of a DSP and a microprocessor, a plurality of microprocessors, one or more microprocessors in conjunction with a DSP core, or any other such configuration. The one or more processors may be shared by multiple circuits (e.g., circuits 550-586 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In an exemplary embodiment, two or more processors may be coupled via a bus to enable independent, parallel, pipelined, or multi-threaded instruction execution. All such variations are intended to fall within the scope of the present disclosure.

Also shown in FIG. 5, in an exemplary embodiment the processing circuit 504 also includes the memory device 508. According to an exemplary embodiment, the memory device 508 (e.g., memory, memory unit, storage device) includes one or more devices (e.g., RAM, ROM, Flash memory, hard disk storage) for storing data and/or computer code for completing or facilitating the various processes, layers and modules described in the present disclosure. The memory device 508 may be communicably connected to the processor 506 to provide computer code and/or instructions to the processor 506 (and/or the processing circuit 504) for executing at least some of the processes described herein. Moreover, in an exemplary embodiment the memory device 508 includes tangible, non-transient volatile memory or non-volatile memory. Accordingly, the memory device 508 may include database components, object code components, script components, or any other type of information structure for supporting the various activities and information structures described herein.

As shown in FIG. 5, in an exemplary embodiment the control system 510 includes a plurality of circuits (e.g., circuits 550-586). In one configuration, the circuits 550-586 of the control system 510 are embodied as machine or computer-readable media that is executable by a processor, such as the processor 506. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the circuits (e.g., circuits 550-586) of the control system 510 may be embodied as hardware units, such as electronic control units. As such, the circuits (e.g., circuits 550-586) may be embodied as one or more circuitry components including, but not limited to, processing circuitry, network interfaces, peripheral devices, input devices, output devices, sensors, etc. In an exemplary embodiment, the circuits (circuits 550-586) take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the circuits (e.g., circuits 550-586) may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). In an exemplary embodiment, the circuits (e.g., circuits 550-586) also include programmable hardware devices such as field programmable gate arrays, programmable array logic, programmable logic devices or the like. The circuits may include one or more memory devices for storing instructions that are executable by the processor(s) of the circuits (e.g., circuits 550-586). The one or more memory devices and processor(s) may have the same definition as provided below with respect to the memory device 508 and the processor 506. In some hardware unit configurations, the circuits (e.g., circuits 550-586) may be geographically dispersed throughout separate locations in a vehicle (e.g., the wrecker truck 100, the carrier truck 300). In an exemplary embodiment, and as shown in FIG. 5, the circuits (e.g., circuits 550-586) are embodied in or within a single unit/ housing, which is shown as the controller 502.

As discussed above, in an exemplary embodiment the control system 510 includes a plurality of circuits. For example, the control system 510 may include a vehicle circuit 550, a platform circuit 552, a wheel circuit 554 a boom circuit 556, a cross bar circuit 558, a winch circuit 560, a resistance circuit 570, a line circuit 572, a snatch block circuit 574, a towing load circuit 580, a rigging load circuit 582, an error circuit 584, and a communications circuit 586. In an exemplary embodiment, the circuits of the control system 510 (e.g., circuits 550-586) receive data from, and/or send data to, an external device (e.g., the vehicle sensor 514, the user device 516, the network 520, the server 522 etc.) via the communications interface 512, the processing circuit 504 (e.g., the processor 506 and/or the memory device 508), and/or another circuit of the control system 510. Moreover, in an exemplary embodiment, the circuits of the control system 510 (e.g., circuits 550-586) are further configured to receive, process, analyze, determine, communicate, send, etc. data relating to various vehicle components, as discussed below.

In an exemplary embodiment, the vehicle circuit 550 is configured to determine the properties and/or parameters of a vehicle. According to an exemplary embodiment, the vehicle circuit 550 is configured to receive vehicle input data (e.g., from an external device, components of the controller 502, etc.). Based on the vehicle input data, the vehicle circuit 550 may be configured to determine properties and/or parameters of a vehicle. For example, the vehicle circuit 550 may determine the number of axles of the vehicle (e.g., single axle, tandem axle, tri-ale, etc.), properties of the wheelbase of the vehicle (e.g., distance from the centerline of the front axle to the centerline of the rear axle), and/or the overhang of the vehicle (e.g., the distance from the center-line of the drive axle to the lift point). Further, for example, the vehicle circuit 550 may determine properties of the axle(s) of the vehicle, for example the steer axle weight (e.g., the weight applied to the front axle), the drive axle weight (e.g., the weight applied to the rear axle), the drive axle weight rating (e.g., the weight capacity of the drive axle according to the manufacturer), and/or the steer axle utilization (e.g., the desired percentage of the load to remain on the vehicle's steer axle when the load is lifted). In an exemplary embodiment, the vehicle circuit 550 is further configured to communicate the properties and/or parameters of the vehicle (e.g., to external devices, other components of the controller 502, other circuits of the control system 510) as vehicle output data, as discussed below.

According to an exemplary embodiment, the platform circuit 552 is configured to determine the properties and/or parameters of the platform 114. In an exemplary embodiment, the platform circuit 552 is configured to receive platform input data (e.g., from an external device, components of the controller 502, etc.). Based on the platform input data, the platform circuit 552 may be configured to determine properties and/or parameters of the platform 114. For example, the platform circuit 552 may determine the platform 114 weight rating (e.g., the weight capacity of the platform 114), the position of the platform 114 (e.g., zero degrees relative to the frame 104, 45 degrees relative to the frame 104, 30 degrees relative to the frame and in communication with the ground, etc.), the load on any platform 114 support members (e.g., downward force, weight, etc.), and/ or any other suitable properties of the platform 114. In an exemplary embodiment, the platform circuit 552 is further configured to communicate the properties and/or parameters of the platform 114 (e.g., to external devices, components of the controller 502, etc.) as platform output data, as discussed below.

The wheel circuit 554 is configured to determine the properties and/or parameters of the wheels, according to an exemplary embodiment. Similar to other circuits discussed above, the wheel circuit 554 may be configured to receive wheel input data (e.g., from an external device, components of the controller 502, etc.). Based on the wheel input data, the wheel circuit 554 may be configured to determine properties and/or parameters of the wheels. For example, the wheel circuit 554 may determine the properties of the wheel axle set(s) (e.g., a single wheel axle set 110 at the truck front end 106, a dual wheel axle set 112 at the truck rear end 108, a second dual wheel axle set 112 at the truck rear end, etc.), the positioning of the wheels (e.g., front wheels are aligned with back wheels, front wheels are turned away from a load, etc.), the status of the wheels (e.g., locked, unlocked, parking break assist activated, etc.), and/or any other suitable properties of the wheels. In an exemplary embodiment, the wheel circuit 554 is further configured to communicate the properties and/or parameters of the wheels (e.g., to external devices, components of the controller 502, etc.) as wheel output data, as discussed below.

In an exemplary embodiment, the boom circuit 556 is configured to determine the properties and/or parameters of the boom 126. According to an exemplary embodiment, the boom circuit 556 is configured to receive boom input data (e.g., from an external device, components of the controller 502, etc.). Based on the boom input data, the boom circuit 556 may be configured to determine properties and/or parameters of the boom 126. For example, the boom circuit 556 may determine the boom 126 weight rating (e.g., the weight capacity of the boom 126 retracted, the weight capacity of the boom 126 extended, etc.), the position of the boom 126 (e.g., retracted, extended, zero degrees relative to the frame 104, 45 degrees relative to the frame 104, etc.), and/or any other suitable properties of the boom 126. In an exemplary embodiment, the boom circuit 556 is further configured to communicate the properties and/or parameters of the boom 126 (e.g., to external devices, components of the controller 502, etc.) as boom output data, as discussed below.

Also according to an exemplary embodiment, the cross bar circuit 558 is configured to determine the properties and/or parameters of the cross bar 128. In an exemplary embodiment, the cross bar circuit 558 is configured to receive cross bar input data (e.g., from an external device, components of the controller 502, etc.). Based on the cross bar input data, the cross bar circuit 558 may be configured to determine properties and/or parameters of the cross bar 128. For example, the cross bar circuit 558 may determine the cross bar 128 weight rating (e.g., the weight capacity of the boom 126 fully extended, etc.), the position of the tilt arm 134 (e.g., perpendicular to the frame 104, parallel to the frame 104, parallel to the frame 104 and in communication with the ground, etc.), the properties of the self-loader (e.g., a manual wheel grid, a hydraulic wheel grid, a pivoting wheel grid, a motorcycle towing adapter, etc.), and/or any other suitable properties of the cross bar 128. In an exemplary embodiment, the cross bar circuit 558 is further configured to communicate the properties and/or parameters of the cross bar 128 (e.g., to external devices, components of the controller 502, etc.) as cross bar output data, as discussed below.

In an exemplary embodiment, the winch circuit 560 is configured to determine the properties and/or parameters of the winch 150. According to an exemplary embodiment, the winch circuit 560 is configured to receive winch input data (e.g., from an external device, components of the controller 502, etc.). Based on the winch input data, the winch circuit 560 may be configured to determine properties and/or parameters of the winch 150. For example, the winch circuit 560 may determine the winch 150 weight rating (e.g., the weight capacity with a steel wire rope, weight capacity of a synthetic wire rope, weight capacity of a line 154 of a first diameter, weight capacity of a line 154 of a second diameter, etc.), the properties of the winch 150 drum(s) (e.g., single drum, dual drum, etc.), the properties of the drive mechanism of the winch 150 (e.g., a winch free spool device, a tensioning device, etc.), and/or any other suitable properties of the winch 150. In an exemplary embodiment, the winch circuit 560 is further configured to communicate the properties and/or parameters of the winch 150 (e.g., to external devices, components of the controller 502, etc.) as winch output data, as discussed below.

According to an exemplary embodiment, the resistance circuit 570 is configured to determine the resistance properties and/or parameters of a load. The resistance circuit 570 may be configured to receive resistance input data (e.g., via an external device, components of the controller 502, etc.). Based on the resistance input data, the resistance circuit 570 may be configured to determine properties and/or parameters of a load or casualty. For example, the resistance circuit 570 may determine the resistance of a load (e.g., the force needed to lift a load, force needed to pull a load, etc.), the adjusted resistance of a load (e.g., the adjusted force needed when the load is submerged, the load is elevated relative to the frame 104, the load is lower than the frame 104, etc.), and/or any other suitable resistance properties of a load. In an exemplary embodiment, the resistance circuit 570 is further configured to communicate the resistance properties and/or parameters of a load (e.g., to external devices, components of the controller 502, etc.) as resistance output data, as discussed below.

In an exemplary embodiment, the line circuit 572 is configured to determine the properties and/or parameters of the line 154. According to an exemplary embodiment, the line circuit 572 is configured to receive line input data (e.g., from an external device, components of the controller 502, etc.). Based on the line input data, the line circuit 572 may be configured to determine properties and/or parameters of the line 154. For example, the line circuit 572 may determine the material properties of the line 154 (e.g., steel wire, synthetic wire, cable, etc.), the diameter of the line 154, the working load limit of the line 154, and/or any other suitable properties of the line 154. In an exemplary embodiment, the line circuit 572 is further configured to communicate the line 154 properties and/or parameters (e.g., to external devices, components of the controller 502, etc.) as line output data, as discussed below.

In an exemplary embodiment, the snatch block circuit 574 is configured to determine the properties and/or parameters of the snatch block(s) 130. According to an exemplary embodiment, the snatch block circuit 574 is configured to receive snatch block input data (e.g., from an external device, components of the controller 502, etc.). Based on the snatch block input data, the snatch block circuit 574 may be configured to determine properties and/or parameters of (or at) the snatch block(s) 130. For example, the snatch block circuit 574 may determine the working load limit of the snatch block(s) 130 (e.g., the working load limit of a first snatch block, a second snatch block, etc.), the properties of the sheave wheel(s) at the snatch block(s) 130 (e.g., the pitch diameter of a sheave wheel at a first snatch block location, at a second snatch block 130 location, etc.), the angle(s) of the line 154 as the line 154 enters and/or exits the snatch block(s) 130 (e.g., the angle(s) as the line 154 enters/exits at a first snatch block, at a second snatch block, at a third snatch block, etc.), the diameter of the line 154 at the snatch block(s) 130 (e.g., the diameter of the line 154 at a first snatch block, at a second snatch block, etc.), and/or any other suitable properties of the snatch block(s) 130. In an exemplary embodiment, the snatch block circuit 574 is further configured to communicate the snatch block(s) 130 properties and/or parameters (e.g., to external devices, components of the controller 502, etc.) as snatch block output data, as discussed below.

According to an exemplary embodiment, the towing load circuit 580 is configured to determine the properties and/or parameters of a towing load. In an exemplary embodiment, the towing load circuit 580 is configured to receive towing load input data (e.g., vehicle input data from an external device, vehicle output data from the vehicle circuit 550, other data from external devices and/or components of the controller 502, etc.). Based on the towing load input data, the towing load circuit 580 may be configured to determine properties and/or parameters of a towing load. For example, in an exemplary embodiment, the towing load circuit 580 receives vehicle input data (e.g., from an external device) or vehicle output data (e.g., from the vehicle circuit 550, other circuits of the control system 510, etc.), and determines the tow performance (e.g., the heaviest load that can be lifted while maintaining steer axle utilization, discussed above, at the selected overhang length), the remaining steer axle weight (e.g., the load applied to the steer axle after lifting the tow performance load), and/or the remaining steer axle utilization (e.g., the percentage of the load that remains on the steer axle after lifting the tow performance load). Moreover, the towing load circuit 580 may also be configured determine the loaded drive axle weight (e.g., the load applied to the drive axle after lifting the tow performance load), the loaded drive axle utilization (e.g., the percentage of the drive axle weight rating, discussed above, on the drive axle after lifting the tow performance load), and/or any other suitable towing load properties or parameters. In an exemplary embodiment, the towing load circuit 580 is further configured to communicate the towing load properties and/or or parameters (e.g., to external devices, components of the controller 502, etc.) as towing load output data, as discussed below.

In an exemplary embodiment, the towing load circuit 580 determines the properties and/or parameters of a towing load using various algorithms, mathematical equations, measurements, vehicle component properties, etc. For example, the tow performance may be determined using the following equation:

$$TP=[(1-U_{STEER\ AXLE}) \times W_{STEER\ AXLE} \times WB]/OH$$

wherein the tow performance (TP) is a product of the load lost at the vehicle's steer axle ($1-U_{STEER\ AXLE}$), the weight applied to the vehicle's steer axle ($W_{STEER\ AXLE}$, or steer axle weight), and the distance between the centerline of the steer axle and the centerline of the drive axle (WB, or wheelbase), all divided by the distance from the centerline of the drive axle to the lift point (OH, or overhang). In an exemplary embodiment, the remaining steer axle weight is calculated as:

$$W_{STEER\ AXLE,REM}=W_{STEER\ AXLE} \times U_{STEER\ AXLE}$$

wherein the remaining steer axle weight ($W_{STEER\ AXLE,\ REM}$) is a product of the weight applied to the vehicle's steer axle ($W_{STEER\ AXLE}$) and the (desired) percent weight remaining on the steer axle when the load is lifted ($U_{STEER\ AXLE}$, or steer axle utilization). In this regard, the remaining steer axle utilization ($U_{STEER\ AXLE,\ REM}$) may be equal to the desired steer axle utilization ($U_{STEER\ AXLE}$).

According to an exemplary embodiment, the loaded drive axle weight (e.g., after lifting the tow performance load) is calculated using the following equation:

$$LW_{DRIVE\ AXLE}=[[(WB+OH) \times (TP)]/WB]+W_{DRIVE\ AXLE}$$

wherein the loaded weight of the drive axle ($LW_{DRIVE\ AXLE}$) is a product of the distance from the centerline of the steer axle to the lift point (WB+OH) and the tow performance load (TP), divided by the distance between the centerline of the steer axle and the centerline of the drive axle (WB), with the addition of the weight applied to the drive axle ($W_{DRIVE\ AXLE}$). Further, the loaded drive axle utilization may be calculated using the following:

$$U_{LOAD,DRIVE\ AXLE}=L\ W_{DRIVE\ AXLE}/WR_{DRIVE\ AXLE}$$

wherein the loaded drive axle utilization ($U_{LOAD,\ DRIVE\ AXLE}$) is a percentage of the weight capacity, or weight rating, of the drive axle ($WR_{DRIVE\ AXLE}$) being used by the drive axle after lifting the tow performance load ($LW_{DRIVE\ AXLE}$).

Also in an exemplary embodiment, the towing load circuit 580 is further configured to process the towing load data. For example, the towing load circuit 580 may determine whether the steer axle utilization is above/below a first threshold (e.g., fifty percent), and/or whether the drive axle utilization is above/below a second threshold (e.g., one hundred percent). In an exemplary embodiment, if the towing load circuit 580 determines that the steer axle utilization is above the first threshold, and the drive axle utilization is below the second threshold, the towing load circuit 580 communicates the towing load properties (e.g., to external devices, components of the controller 502, etc.) as towing load output data. Conversely, if the towing load circuit 580 determines the steer axle utilization is below the first threshold, or the drive axle utilization is above the second threshold, the towing load circuit 580 may communicate an error message (e.g., to external devices, components of the controller 502, etc.) as towing load output data, as discussed below. It should be understood that in other exemplary embodiments, the towing load circuit 580 is configured to process (e.g., compare to thresholds, etc.) any suitable towing load properties and/or parameters, as described above.

In an exemplary embodiment, the rigging load circuit 582 is configured to determine the properties and/or parameters of a rigging load. According to an exemplary embodiment, the rigging load circuit 582 is configured to receive rigging load input data (e.g., resistance output data from the resistance circuit 570, line output data from the line circuit 572, snatch block output data from the snatch block circuit 574, rigging load input data from an external device, etc.). Based on the rigging load input data, the rigging load circuit 582 may be configured to determine the properties and/or parameters of the rigging load. For example, the rigging load circuit 582 may determine the adjusted rope working load limit (e.g., the working load limit of the line 154 after the line 154 has been rigged), the rope load (e.g., the amount of tension in the line 154), and/or the rope utilization (e.g., the percentage of the working load limit of the line 154, discussed above, that is used by the rope load). Moreover, in an exemplary embodiment, the rigging load circuit 582 is further configured to determine snatch block load(s) (e.g., the force applied at a first location by a first snatch block 130, the force applied at a second location by a second snatch block 130, etc.), and/or the snatch block utilization (e.g., the percentage of the working load limit of the snatch block(s) 130, discussed above, applied by the snatch block load(s)). In an exemplary embodiment, the rigging load circuit 582 is configured to communicate the rigging load properties and/or parameters (e.g., to external devices, components of the controller 502, etc.) as rigging load output data, as discussed below.

In an exemplary embodiment, the rigging load circuit 582 determines the properties and/or parameters of a rigging load using various algorithms, mathematical equations, measurements, vehicle component properties, etc. For example, when a line 154 is bent or encounters friction (e.g., at a first location A, at a second location B, etc.), the working load limit of the line 154 ($WLL_{ROPE}$) may be reduced. As such, in an exemplary embodiment, the adjusted wire rope working load limit ($WLL_{ROPE,ADJ}$) is determined using the following equation(s):

$$WLL_{ROPE,ADJ,A}=WLL_{ROPE}\times(1-E_{B,A})\times(1-R_S)$$

$$WLL_{ROPE,ADJ,B}=WLL_{ROPE}\times(1-E_{B,A})\times(1-R_S)\times(1-E_{B,B})\times(1-R_S)$$

wherein the $WLL_{ROPE,ADJ}$ is a product of the working load limit of the line 154 ($WLL_{ROPE}$), and the efficiencies at different locations (e.g., first location A, second location B, etc.). This pattern (e.g., mathematical pattern) may continue for additional locations where the line 154 is bent or encounters friction (e.g., a third location C, etc.). In an exemplary embodiment, the efficiencies are calculated using assumptions and/or standard equations. For example, it may be assumed that there is a percentage loss of efficiency in the snatch block(s) 130 due to frictional loss (e.g., $R_S$=0.01, representing a one percent loss). Further, for example, to account for the amount of strength the line 154 loses when bent around a location, the following equations may be used:

$$E_B=\left(\frac{0.5}{\sqrt{D/d}}\right)$$

$$E_B=\left(\frac{0.5}{\sqrt{D/d}}\right)\left(\frac{180-\theta}{180}\right)$$

wherein "D" is the sheave wheel diameter, discussed above, and "d" is the diameter of the line 154 at a location. In an exemplary embodiment, in instances where the line 154 does not fully bend around a location (e.g., a sheave wheel), the result is multiplied by an angle ratio $$\left(\frac{180-\theta}{180}\right)$$

to determine the proportionate loss of strength, as shown in the second equation above.

Figure 13:
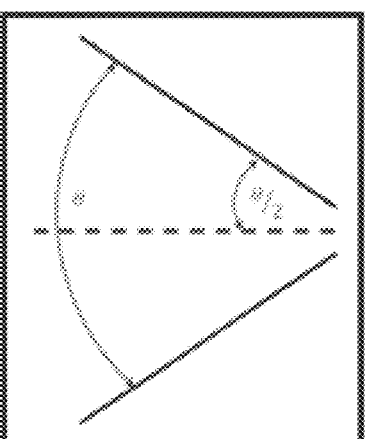
FIG. 13 is an angle diagram of an equation for calculating a mechanical advantage, according to an exemplary embodiment.

Also in an exemplary embodiment, the rigging load circuit 582 determines the rope load ($L_{ROPE}$) using the following equation:

$$L_{ROPE}=\frac{L_{CASUALTY}}{MA}$$

wherein the rope load ($L_{ROPE}$) is the amount of tension applied to the line 154 when a load is lifted (e.g., the resistance of a load or casualty, discussed above with regard to the resistance circuit 570) and the mechanical advantage (MA) from the snatch block(s) 130 are accounted for. In an exemplary embodiment, the MA from the snatch block(s) 130 is determined by the rigging load circuit 582 using the following equations, and with reference to FIG. 13:

$$MA=2\cos\theta/z$$

$$MA=1$$

$$MA=0$$

wherein when the line 154 is attached to the load via the snatch block 130 (and then directed to an anchor point), the angle ($\theta$) may be used to determine the MA. Also in an exemplary embodiment, if the line 154 is attached to the load, MA=1. However, if the line 154 is not attached to the load, MA=0, as shown above. Furthermore, in an exemplary embodiment, the rigging load circuit 582 determines the rope utilization ($U_{ROPE}$) using the following equation:

$$U_{ROPE}=\frac{L_{ROPE}}{WLL_{ROPE,ADJ}}$$

wherein the rope utilization ($U_{ROPE}$) is the percentage of the adjusted working load limit ($WLL_{ROPE,ADJ}$), discussed above, that is being used by the rope load ($L_{ROPE}$).

In an exemplary embodiment, the rigging load circuit 582 further determines the snatch block load(s) ($L_{BLOCK}$) using the following equation:

$$L_{BLOCK}=L_{ROPE}\times2\cos\theta/2$$

wherein the snatch block load(s) ($L_{BLOCK}$) is the amount of load being applied at a particular snatch block 130 based on the rope load ($L_{ROPE}$) and the angle ($\theta$) the line 154 enters and exits the snatch block 130, as discussed above with regard to the snatch block circuit 574. Moreover, in an exemplary embodiment, the rigging load circuit 582 determines the snatch block utilization ($U_{BLOCK}$) using the following equation:

$$U_{BLOCK}=\frac{L_{BLOCK}}{WLL_{BLCOK}}$$

wherein the snatch block utilization ($U_{BLOCK}$) is the percentage of the working load limit of the snatch block 130, discussed above with regard to the snatch block circuit 574, that is being used at the snatch block 130 ($L_{BLOCK}$).

Also in an exemplary embodiment, the rigging load circuit 582 is configured to process the rigging load data. For example, the rigging load circuit 582 may determine whether the utilization data for the vehicle components are above/below a threshold (e.g., one hundred percent), and/or a plurality of thresholds (e.g., a first threshold, a second threshold, etc.). In an exemplary embodiment, if the rigging load circuit 582 determines that the utilization data for all components is below a threshold (e.g., one hundred percent), the rigging load circuit 582 communicates the rigging load properties (e.g., to external devices, components of the controller 502, etc.) as rigging load output data. Conversely, if the rigging load circuit 582 determines the utilization data for any component is above the threshold, the rigging load circuit 582 may communicate an error message (e.g., to external devices, components of the controller 502, etc.) as rigging load output data, as discussed below. The error message may include component parameter information, as discussed below, or a recommended modification (e.g., a recommendation to increase the number of snatch block(s) 130, increase the pitch diameter of a sheave wheel in the snatch block(s) 130, increase the working load limit of the snatch block(s) 130, modify the angle of the line 154 as the line 154 enters/exits the snatch block(s) 130, etc.). It should be understood that in other exemplary embodiments the rigging load circuit 582 is configured to process (e.g., compare to threshold(s)) any suitable rigging load properties and/or parameters, as described above.

According to an exemplary embodiment, the error circuit 584 is configured to process input data and determine whether an error message should be communicated. As discussed briefly above, in an exemplary embodiment the error circuit 584 receives an error message in the form of towing load output data and/or rigging load output data, and communicates a towing load error message and/or rigging load error message in the form of error output data. In addition, the error circuit 584 may be configured to receive various forms of input data, for example input data in the form of towing load output data (e.g., vehicle output data from the vehicle circuit 550, towing load output data from towing load circuit 580, etc.), rigging load out data (e.g., resistance output data from the resistance circuit 570, line output data from the line circuit 572, snatch block output data from the snatch block circuit 574, rigging load output data from the rigging load circuit 582, etc.), and/or any other input data from other suitable sources (e.g., input data from external devices, other components of the controller 502, etc.). Based on the input data, the error circuit 584 may be configured to process the input data, and determine whether an error message should be communicated (e.g., in the form of error output data).

For example, if the error circuit 584 receives resistance data (e.g., resistance output data from the resistance circuit 570, data from external devices, etc.), and determines that the resistance of a load is not greater than a threshold (e.g., zero), the error circuit 584 may communicate an error message (e.g., "Resistance of Casualty must contain a value greater than zero") in the form of error output data. Moreover, if the error circuit 584 receives line 154 data (e.g., line output data from the line circuit 572, data from external devices, etc.), and determines that the line 154 diameter is not greater than a threshold (e.g., zero, 0.001, 0.0001, etc.), the error circuit 584 may communicate an error message (e.g., "Rope Diameter must contain a value greater than zero") as error output data. Similarly, if the error circuit 584 receives line 154 data, as discussed above, and determines that the rope (or line 154) working load limit is not greater than a threshold (e.g., zero), the error circuit 584 may communicate a different error message (e.g., "Rope Working Load Limit must contain a value greater than zero") as error output data. In an exemplary embodiment, the error circuit 584 is also configured to receive snatch block(s) 130 data (e.g., snatch block output data from the snatch block circuit 574, data from external devices, etc.). If the error circuit 584 determines that the angle of the line 154 as it enters/exits the snatch block(s) 130 is not between a threshold (e.g., 0-180 degrees, 0-120 degrees, 0-90 degrees, etc.), the error circuit 584 may communicate an error message (e.g., "Angles must contain a value between 0 and 180") as error output data. Similarly, if the error circuit 584 determines that the pitch diameter of a sheave wheel at the snatch block(s) 130 is not greater than a threshold value (e.g., zero), the error circuit 584 may communicate a different error message (e.g., "Diameters must contain a value greater than zero") as error output data.

In an exemplary embodiment, the communications circuit 586 is configured to receive data (e.g., from the circuits 550-584 of the control system 510, the processor 506 and/or the memory device 508 of the processing circuit 504, etc.), and communicate output data to the external devices (e.g., the vehicle sensor 514, the user device 516, the user application 518, the network 520, the server 522, etc.). In an exemplary embodiment, the communications circuit 586 is also configured to provide any of the data that is collected, calculated, processed, analyzed, etc., as described above, to any external devices and/or other suitable devices.

Referring still to FIG. 5, in an exemplary embodiment the controller 502 also includes the communications interface 512. According to an exemplary embodiment, the communications interface 512 is structured to provide and enable communications between and among the processing circuit 504, the control system 510, and/or external devices (e.g., the vehicle sensor 514, the user device 516, the network 520, the server 522, etc.).

As shown in FIG. 5, in an exemplary embodiment the VMS 500 also includes a user device 516 (having a user application 518). According to an exemplary embodiment, the user device 516 is a computing device including a memory (e.g., RAM, ROM, Flash memory, hard disk storage, etc.), a processor (e.g., a general purpose processor, an application specific integrated circuit (ASIC), one or more field programmable gate arrays (FPGAs), a group of processing components, or other suitable electronic processing components), and a user interface (e.g., a touch screen). The user device 516 may include, for example mobile phones, electronic tablets, laptops, desktop computers, workstations, and other types of electronic devices, which allow a user to interact with the components of the VMS 500 (e.g., through a user interface). In an exemplary embodiment, the user device 516 communicates (e.g., send, receive, transmit, etc. data) with the controller 502 via the communications interface 512. In some embodiments, the user device is also connected to the network 520 and/or the server 522 via an intranet or via the Internet, either via a wired connection or a wireless connection. The user device 516 may be configured to receive data (e.g., input data from a user via the touchscreen, from the user application 518, from the network 520, the server 522, etc.), and perform the functions of the controller 502 (e.g., the circuits 550-586 of the control system 510, the processing circuit 504, etc.), discussed above, via the components of the user device 516. In this regard, the user device 518 may be configured to receive, process, analyze, and send data relating to vehicle component properties and/or parameters.

Also shown in FIG. 5, in an exemplary embodiment the user device 516 also includes the user application 518. According to an exemplary embodiment, the user application 518 is configured to communicate (e.g., receive, transmit, send, etc. data) with the user device 516, and/or other components of the VMS 500. For example, the user application 518 may be configured to receive input data (e.g., towing load information from a user via the user interface, an image or video, a touch screen, rigging load information from the network 520, the server 522, or from another communications device, etc.), communicate the input data with the user device 516 (which may process the input data), receive output data, and/or display the input/output data via a user interface, as discussed below. In some embodiments, the user application 518 is configured to utilize components of the user device 516 (e.g., a camera, image, video, etc.) to receive input data. The user application 518 may also be configured to communicate the input data (e.g., in the form of user application output data) to the controller 502 via the communications interface 512. As discussed above, the circuits (e.g., circuits 550-586) may receive and process the user application output data, and provide additional output data (e.g., towing load output data, rigging load output data, etc.) to the user application 518 (e.g., and the user device 516) via the communications interface 512. In an exemplary embodiment, the user application 518 displays the input/output data via a user interface, which can be manipulated by a user, as discussed below.

Referring still to FIG. 5, in an exemplary embodiment the VMS 500 also includes the vehicle sensor 514. The vehicle sensor 514 may be any type of sensor that is configured to determine and/or measure one or more properties and/or parameters of components of a vehicle (e.g., the wrecker truck 100, the carrier truck 300, etc.). For example, the vehicle sensor 514 may determine the properties of a vehicle (e.g., number of axles, properties of the wheelbase, overhang of the vehicle, properties of the axle(s), etc.), properties of the platform 114 (e.g., angle of the platform, positioning of supports, etc.), properties of the wheels (e.g., aligned, locked, unlocked, etc.), properties of the boom 126 (e.g., angle, extension, number of snatch blocks etc.), and/or properties of the cross bar 128 (e.g., angle, height, position, etc.). Further, for example, the vehicle sensor 514 may determine the properties of the line 154 (e.g., material, diameter, working load limit, etc.), properties of the hook 156 (e.g., material, size, load limit, etc.), properties of the snatch block(s) 130 (e.g., number of sheave wheels, angle as the line 154 enters/exits a first sheave wheel and/or snatch block 130, angle as the line 154 enters/exits a second sheave wheel and/or snatch block 130, etc.), determine the number of coupling points of the line 154 to the vehicle (e.g., a direct pick, an indirect pick, two couplings, etc.), and/or any other suitable properties and/or parameters of vehicle components. In an exemplary embodiment the vehicle sensor 514 is communicably coupled with the controller 502, such that the vehicle sensor 514 and the controller 502 may send and/or receive data (e.g., vehicle component data, etc.) via the communications interface 512. It should be understood that while only one vehicle sensor 514 is shown, any number of vehicle sensors 514 may be used to determine and/or measure the properties and/or parameters of a vehicle (e.g., collect and communicate vehicle component data, etc.). It should also be understood that while the vehicle sensor 514 is shown, the controller 502 may be configured to determine and/or measure the properties and/or parameters of a vehicle.

As shown in FIG. 5, in an exemplary embodiment the VMS 500 also includes the network 520. The network 520 may be a communications network (e.g., a WAN, the Internet, a cellular network, etc.) and/or any suitable wired or wireless network. In an exemplary embodiment, the controller 502, the user device 516 (e.g., the user application 518), the vehicle sensor 514, and/or the server 522 are configured to receive and/or transmit data via the network 520.

Also shown in FIG. 5, in an exemplary embodiment the VMS 500 also includes the server 522. The server 522 may be any suitable computing device or system, for example, a desktop or laptop computer, a remote system (e.g., a cloud server), central computing system, etc. In an exemplary embodiment, the server 522 is configured to receive, process, store, and/or transmit data (e.g., data from any of the circuits 550-586 of control system 510, data from the components of the controller 502, etc.) to/from various other components of the VMS 500. For example, the server 522 may be configured to receive and/or transmit towing load data and/or rigging load data via the network 520. In some embodiments, the server 522 is also configured to obtain data from multiple controllers 502 across a fleet of vehicles, and/or perform any of the functions of the controller 502 to provide data to the user device 516 (e.g., the user application 518).

According to the exemplary embodiments shown in FIGS. 6-10, vehicle monitoring interfaces are provided, which present a variety of graphical user interfaces (GUIs). The vehicle monitoring interfaces (e.g., the GUIs) may be presented via a user interface of the user device 516 and/or via the user application 518, and may be part of the VMS 500 of FIG. 5. For exemplary purposes only, FIGS. 6-10 describe various GUIs as being presented via the user application 518 (e.g., on a mobile device); however, this is not intended to be limiting, and the GUIs may be presented via any other suitable application and/or device. As discussed in further detail below, in an exemplary embodiment the user application 518 (via the user device 516) provides a startup GUI, a terms and conditions GUI, a menu GUI, a fleet list or a vehicle list GUI, a vehicle model selection GUI, a towing performance GUI, a rigging work load limit GUI, an error GUI, etc. It should be understood that in other embodiments the user application 518 also includes additional, fewer, and/or different working components (e.g., GUIs, interfaces, etc.).

Figure 6:
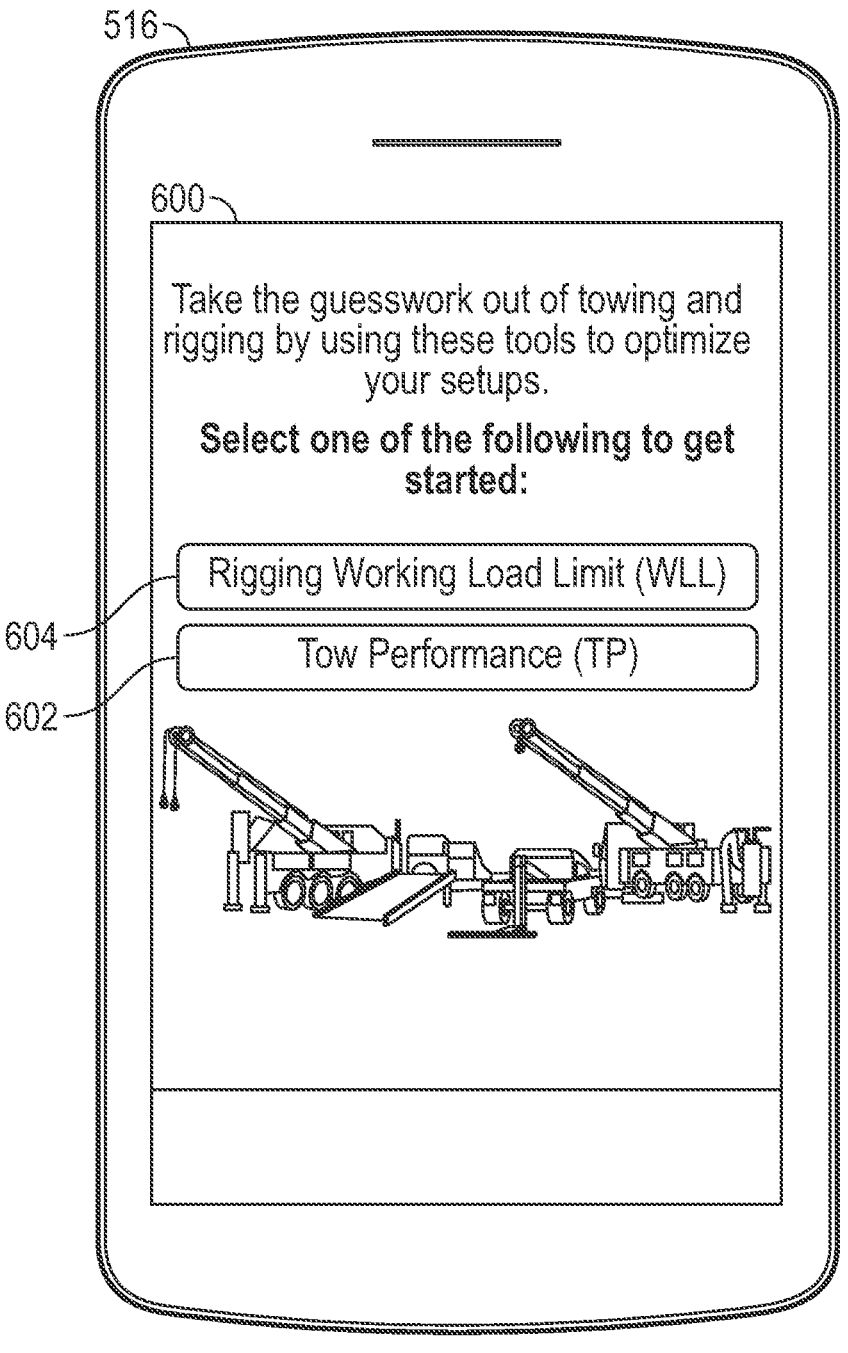
FIG. 6 is a diagram of a user device of a vehicle management system of FIG. 5, displaying a first graphical user interface (GUI), according to an exemplary embodiment.

According to the exemplary embodiment shown in FIG. 6, a menu interface, shown as setup menu interface 600, includes a towing performance icon 602 and a rigging working load limit (WLL) icon 604 (hereinafter, "rigging WLL icon 604"). The towing performance icon 602 and/or the rigging WLL icon 604 may be selected, which may cause the user application 518 to display a secondary GUI that relates to the selected icon. For example, the towing performance icon 602 may be selected, which causes the user application 518 to display a towing performance interface, as discussed below. In this regard, in an exemplary embodiment, a user interacts with the user application 518 (e.g., via the user interface, a touchscreen, voice command, etc.), and the user application 518 displays related GUIs. It should be appreciated that in some embodiments the setup menu interface 600 includes additional, fewer, and/or different working components (e.g., icons relating to other vehicles, vehicle setups, vehicle procedures, vehicle properties, etc.).

Figure 7:
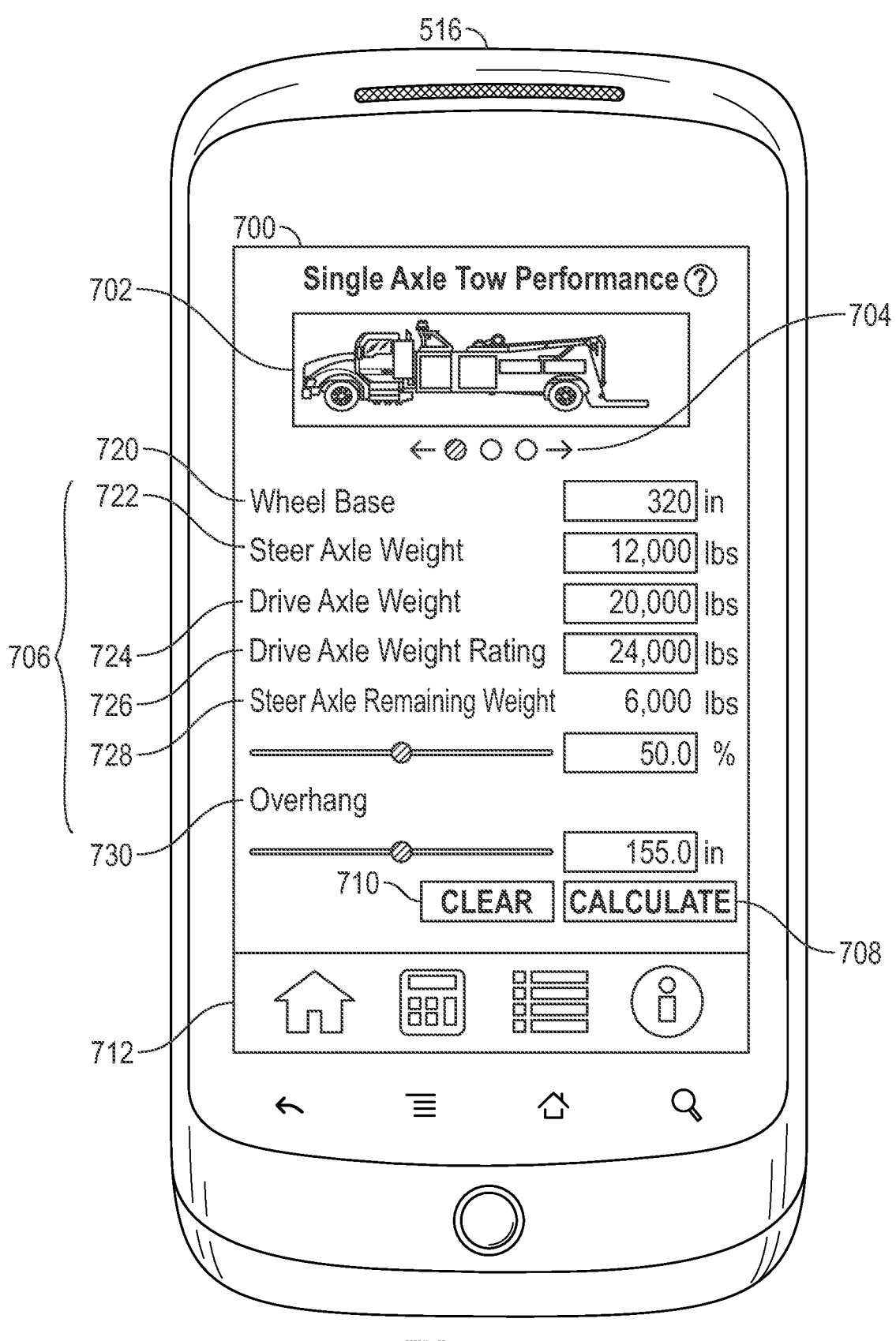
FIG. 7 is a diagram of a user device of a vehicle management system of FIG. 5, displaying a second graphical user interface (GUI), according to an exemplary embodiment.

According to the exemplary embodiment shown in FIG. 7, after the towing performance icon 602 is selected, the user application 518 may display a towing interface, shown as towing performance interface 700. According to an exemplary embodiment, the towing performance interface 700 includes a vehicle diagram 702, a tow performance slider 704, a vehicle information block 706, a calculate icon 708, a clear icon 710, and a menu bar 712. As shown in FIG. 7, and as will be discussed in further detail below, the vehicle information block 706 includes additional data icons, for example a wheel base icon 720, a steer axle weight icon 722, a drive axle weight icon 724, a drive axle weight rating icon 726, a steer axle remaining icon 728, and an overhang icon 730.

As shown in FIG. 7, in an exemplary embodiment the vehicle diagram 702 provides a visual representation of a tow performance vehicle setup (e.g., the wrecker truck 100, the carrier truck 300, etc.). According to an exemplary embodiment, the tow performance slider 704 may be selected, which changes the vehicle diagram 702 (and the vehicle information block 706) displayed in the towing performance interface 700. For example, as shown in FIG. 7, the vehicle diagram 702 illustrates a single axle tow vehicle. If the tow performance slider 704 is selected, the towing performance interface 700 (e.g., the vehicle diagram 702) may display another tow performance vehicle, for example a tandem axle vehicle, a tri axle vehicle, the wrecker truck 100, the carrier truck 300, etc. In this regard, a user may interact with the user application 518 (e.g., the towing performance interface 700) to view different vehicle diagrams 702, in order to select a tow performance vehicle that resembles the vehicle setup the user is utilizing.

As shown in FIG. 7, the vehicle information block 706 (and the icons 720-730) provides icons for input data (e.g., measurements, calculations, parameters, specifications, etc.). According to an exemplary embodiment, after a tow performance vehicle is selected, the information in the vehicle information block 706 may be input. For example, a user may manually provide a wheel base measurement in the wheel base icon 720, a steer axle weight in the steer axle weight icon 722, a drive axle weight in the drive axle weight icon 724, etc. The data in vehicle information block 706 may be provided once, or a plurality of times, in order to provide suitable data that resembles the vehicle setup the user is utilizing. As shown in FIG. 7, the vehicle information block 706 (e.g., icons 720-730) includes any suitable icon, for example a manual input block, an automatic input block, a button, a slide bar, etc. In some embodiments, the user device 516 and/or the user application 518 is utilized to automatically provide the information in the vehicle information block 706. For example, a user may use the user device 516 and/or the user application 518 (e.g., a camera, picture, video, etc.) to capture the tow performance vehicle setup, and the user device 516 and/or the user application 518 may automatically provide (e.g., analyze, determine, populate, etc.) data in the vehicle information block 706. In other embodiments, the data in vehicle information block 706 is input from an external device of the VMS 500, for example, the controller 502 (e.g., via the vehicle output data from the vehicle circuit 550, the towing load output data from the towing load circuit 580, etc.), the vehicle sensor 514, the network 520, etc. In yet other embodiments, the data in vehicle information block 706 is automatically input (e.g., provided), for example from user preferences, regulatory requirements, safety requirements, etc.

In an exemplary embodiment, the towing performance interface 700 also includes a calculate icon 708 and a clear icon 710. After vehicle data has been input into the vehicle information block 706 (e.g., the icons 720-730 have been populated), the calculate icon 708 or clear icon 710 may be selected. For example, a user may determine that the vehicle data in the vehicle information block 706 resembles the vehicle setup the user is utilizing, and select the calculate icon 708. As will be discussed in greater detail below, after the calculate icon 708 is selected, the data in the vehicle information block 706 may be processed (e.g., via the components of the user device 516), and the results may be displayed in the user application 518. In some embodiments, after the calculate icon 708 is selected, the data in the vehicle information block 706 is communicated to an external device (e.g., the circuits 550-586 of the controller 502, the server 522), processed, and/or returned to the user application 518 (e.g., the user device 516) in the form of results data, which is displayed in the user application 518. For example, after the calculate icon 708 is selected, (and the vehicle data is processed, and results data is provided) the towing performance interface 700 may display a towing performance results block, as discussed below. Conversely, in an exemplary embodiment, if a user determines that the vehicle data in the vehicle information block 706 does not resemble the vehicle setup the user is utilizing, the user selects the clear icon 710, and clears the vehicle data (e.g., icons 720-730). In this regard, the vehicle information block 706 may then be repopulated, via any of the methods discussed above, to better resemble the vehicle setup the user is utilizing.

As shown in FIG. 7, the towing performance interface 700 also includes a menu bar 712. The menu bar 712 may include a plurality of general menu icons, for example a home icon, a calculate icon, a menu page icon, an information icon, etc. In an exemplary embodiment, the menu bar 712 is used to navigate between different displays in the user application 518 and/or different functions of the user application 518.

Figure 8:
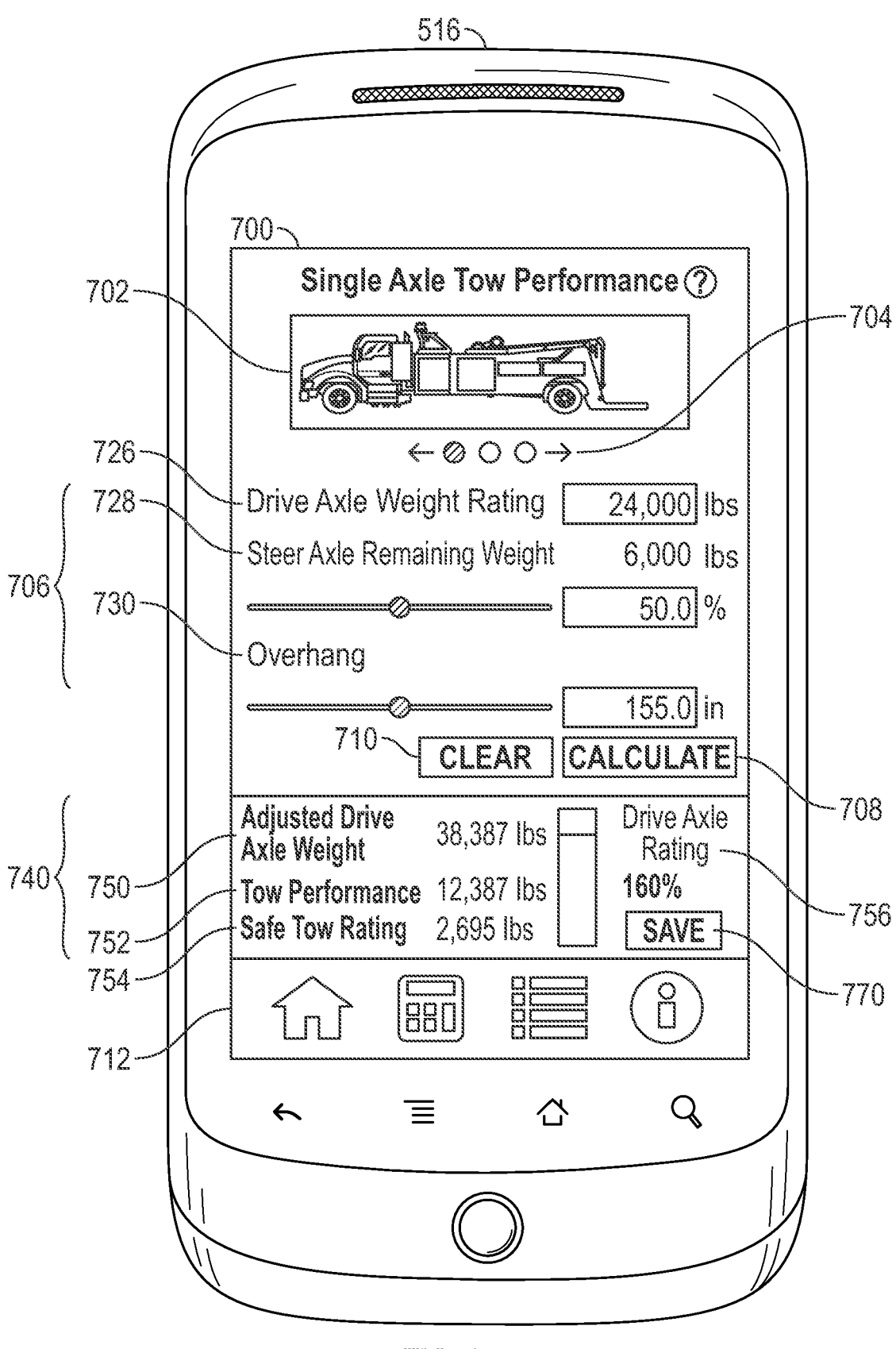
FIG. 8 is a diagram of a user device of a vehicle management system of FIG. 5, displaying a third graphical user interface (GUI), according to an exemplary embodiment.

According to the exemplary embodiment shown in FIG. 8, the towing performance interface 700 includes a results block, shown as towing performance results block 740. According to an exemplary embodiment, after the vehicle information block 706 is populated, and the calculate icon 708 is selected, the vehicle data is processed (and returned) to be displayed in the towing performance results block 740. For example, the data in the vehicle information block 706 may be processed using the components of the user device 516, returned to the user application 518, and/or displayed in the towing performance results block 740. As discussed briefly above, in another exemplary embodiment the data in the vehicle information block 706 is communicated to an external device (e.g., the controller 502, the network 520, the server 522, etc.), processed (e.g., via the circuits 550-586 of the control system 510, etc.), and communicated to the user application 518 (e.g., the user device 516) in the form of results data, which may also be displayed in the towing performance results block 740. For example, the user application 518 may communicate data (e.g., data in the vehicle information block 706) to the towing load circuit 580 via the communications interface 512, the towing load circuit 580 may process the data, and may communicate towing load output data (e.g., results data) to the user application 518 via the communications interface 512. The towing load output (e.g., results) data may then be displayed in the towing performance results block 740 of the towing performance interface 700.

As shown in FIG. 8, the towing performance results block 740 includes an adjusted drive axle weight icon 750, a tow performance weight icon 752, a safe tow rating icon 754, and a drive axle rating icon 756. According to an exemplary embodiment, the tow performance weight icon 752 indicates the heaviest load that can be lifted while maintaining the steer axle utilization at the given overhang, as discussed above. The adjusted drive axle weight icon 750 may indicate the adjusted load applied to drive axle after lifting the tow performance load, as discussed above. The safe tow rating icon 754 may indicate axle weight (e.g., the load on the steer axle, etc.). In an exemplary embodiment, the drive axle rating icon 756 indicates the percentage of the drive axle weight rating that is being used by the drive axle after lifting the tow performance load, as discussed above. In some embodiments, the towing performance results block 740 includes additional icons, for example, a remaining steer axle weight icon 760 (e.g., indicating the load applied to the steer axle after lifting the tow performance load), a remaining steer axle utilization icon 762 (e.g., indicating the percentage of the load that remains on the steer axle after lifting the tow performance load), a loaded drive axle icon 764 (e.g., indicating the load applied to the drive axle after lifting the tow performance load), and/or a loaded drive axle utilization icon 766 (e.g., indicating the percentage of the drive axle weight rating that is being used by the drive axle after lifting the tow performance load). As discussed above with regard to the vehicle information block 706 (e.g., icons 720-730), the towing performance results block 740 may include any suitable icon, for example an automatic output block, a button, a slide bar, a column, etc.

As shown in FIG. 8, the towing performance interface 700 also includes a save icon 770. After the towing performance results block 740 has been populated, the save icon 770 may be selected, and the towing performance data may be saved (e.g., in the user application 518, the user device 516, communicated with the memory device 508 via the communications interface 512, communicated with an external device, etc.) to view, modify, replicate, analyze, process, etc. In an exemplary embodiment, the towing performance interface 700 also includes an acceptable tow icon 772 and/or an error icon 774, for example to indicate whether the towing performance results are within acceptable thresholds. For example, if the remaining steer axle utilization icon 762 is above a first threshold (e.g., fifty percent), and the loaded drive axle utilization icon 766 is below a second threshold (e.g., one hundred percent), the acceptable tow icon 772 may be displayed. Conversely, if the remaining steer axle utilization icon 762 is below the first threshold, or the loaded drive axle utilization icon 766 is above the second threshold, the error icon 774 may be displayed. According to an exemplary embodiment, the data in the vehicle information block 706 (e.g., icons 720-730) may be modified, cleared, saved, etc. in response to an indication that the towing performance results are within/outside acceptable thresholds (e.g., via the towing performance results block 740, acceptable tow icon 772, error icon 774, etc.). Also in an exemplary embodiment, the acceptable towing icon 772 and the error icon 774 are any suitable icons configured to communicate whether the towing performance results are within acceptable thresholds, for example, a green checkmark, a red "X", an error message, etc.

Figure 9:
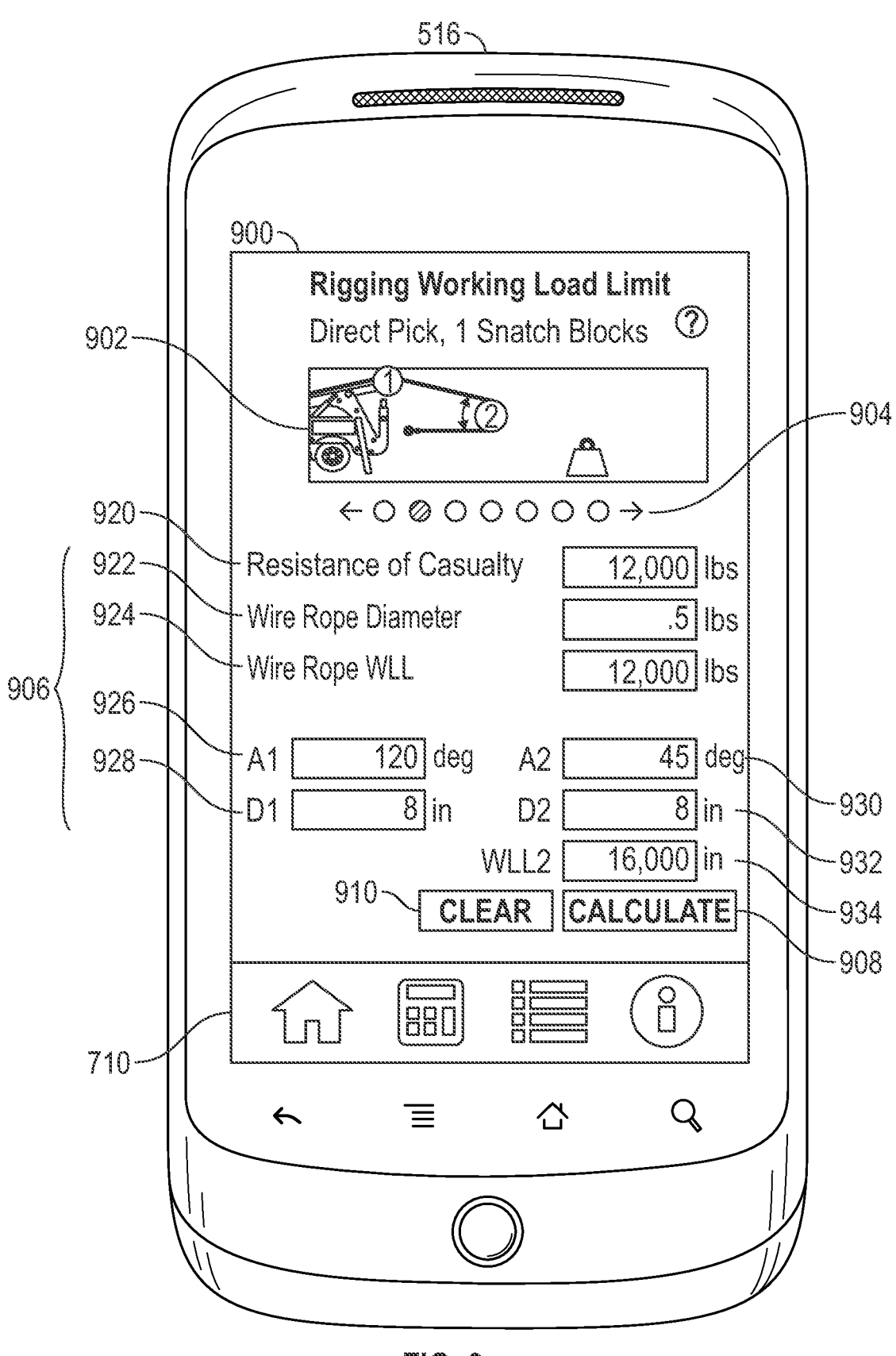
FIG. 9 is a diagram of a user device of a vehicle management system of FIG. 5, displaying a third graphical user interface (GUI), according to an exemplary embodiment.

According to the exemplary embodiment shown in FIG. 9, after the rigging WLL icon 604 is selected (e.g., as discussed above), the user application 518 may display a rigging interface, shown as rigging working load limit interface 900 (hereinafter, "rigging WLL interface 900"). According to an exemplary embodiment, the rigging WLL interface 900 includes a rigging setup diagram 902, a rigging setup slider 904, a rigging information block 906, a calculate icon 908, a clear icon 910, and a menu bar 712. As shown in FIG. 9, and as will be discussed in further detail below, the rigging information block 906 may include additional data icons, for example a resistance of casualty icon 920, a line diameter icon 922, a line working load limit icon 924 (hereinafter "line WLL icon 924"), a first angle icon 926, a first diameter icon 928, a second angle icon 930, a second diameter icon 932, and/or a second working load limit icon 934 (hereinafter "second WLL icon 934").

As shown in FIG. 9, in an exemplary embodiment the rigging setup diagram 902 provides a visual representation of a rigging setup (e.g., the wrecker truck 100 with a snatch block 130, the wrecker truck 100 with multiple snatch block(s) 130, etc.). According to an exemplary embodiment, the rigging setup slider 904 is selected, which changes the rigging setup diagram 902 (and the rigging information block 906) displayed in the rigging WLL interface 900. Similar to the tow performance slider 704 discussed above, the rigging setup slider 904 may be selected, and the rigging WLL interface 900 may display a different rigging setup, for example a setup with two snatch blocks 130, a setup with an indirect pick, with the boom 126 extended, etc. In this regard, a user may interact with the user application 518 to view different rigging setup diagrams 902, in order to select a rigging setup that resembles the setup the user is utilizing.

As shown in FIG. 9, in an exemplary embodiment the rigging information block 906 (and icons 920-934) provides icons for input data (e.g., measurements, calculations, parameters, specifications, etc.). According to an exemplary embodiment, after the rigging setup is selected, the information in the rigging information block 906 is input. For example, a user may manually provide a resistance weight in the resistance of casualty icon 920, a line diameter measurement in the line diameter icon 922, a line working load limit weight in the line WLL icon 924, etc. As discussed above with regard to the vehicle information block 706, the data in the rigging information block 906 may be provided once or a plurality of times, via a user and/or an external device (e.g., the controller 502, the rigging load circuit 582, the vehicle sensor 514, or any suitable component of the VMS 500, etc.), in order to provide suitable data that resembles the rigging setup the user is utilizing. In some embodiments the user device 516 and/or the user application 518 is utilized to automatically provide the information in the rigging information block 906. For example, a user may use the user device 516 and/or the user application 518 (e.g., a camera, picture, video, etc.) to capture the rigging setup, and the user device 516 and/or the user application 518 may automatically provide (e.g., analyze, determine, populate, etc.) data in the rigging information block 906. In an exemplary embodiment, the rigging information block 906 includes any suitable icon, for example a manual input block, an automatic input block, a button, a slide bar, etc. It should be understood that while only certain icons are shown in the rigging information block 906 (e.g., icons 920-934), additional icons may be displayed in the rigging WLL interface 900 that relate to the rigging setup that is selected. For example, if a rigging setup is selected that utilizes an indirect pick, and three snatch blocks 130, additional icons may be included (e.g., a third angle icon 936, a third diameter icon 938, a third WLL icon 940, a fourth angle icon 942, a fourth diameter icon 944, a fourth WLL icon 946, etc.).

As shown in FIG. 9, the rigging WLL interface 900 also includes a calculate icon 908 and a clear icon 910. Similar to what was discussed above with regard to FIGS. 7-8, according to an exemplary embodiment, after the rigging information has been input into the rigging information block 906 (e.g., icons 920-934 have been populated), the calculate icon 908 or clear icon 910 may be selected. For example, a user may determine the rigging setup data resembles the rigging setup the user is utilizing, and select the calculate icon 908. In an exemplary embodiment, after the calculate icon 908 is selected, the data in the rigging information block 906 is processed (e.g., via the components of the user device 516, etc.) and displayed in the user application (e.g., the rigging WLL interface 900). In some embodiments, after the calculate icon 908 is selected, the data in the rigging information block 906 is communicated to an external device (e.g., the controller 502, the vehicle sensor 514, the network 520, the server 522, etc.), processed (e.g., via the rigging load circuit 582 of the controller 502, etc.), and/or returned to the user application 518 in the form of results data, which may be displayed in the user application 518 (e.g., the rigging WLL interface 900). For example, after the calculate icon 908 is selected (and the rigging setup data is processed, and/or the results are provided), the rigging WLL interface 900 may display a rigging WLL results block, as discussed below. Conversely, if a user determines that the rigging setup data does not resemble the rigging setup the user is utilizing, the user may select the clear icon 910, and clear the rigging data (e.g., icons 920-934). In this regard, the rigging information block 906 may then be repopulated to better resemble the rigging setup that is being used.

According to an exemplary embodiment, the rigging WLL interface 900 also includes instructions or messages (e.g., error messages), which are displayed in response to the rigging setup data in the rigging information block 906. For example, if the weight input into the resistance of casualty icon 920 is not greater than a threshold (e.g., zero), the rigging WLL interface 900 may display the error message: "Resistance of Casualty must contain a value greater than zero." Similarly, if the angle input into the first angle icon 926 is not between a threshold (e.g., 0-180 degrees, 0-120 degrees, 0-90 degrees, etc.), the rigging WLL interface may display the message: "Angles must contain a value between 0 and 180." It should be understood that the rigging WLL interface 900 may display any number of instructions and/or messages (e.g., in response to data in the rigging information block 906, a prompt data input, automatically, etc.) relating to rigging setup data.

Figure 10:
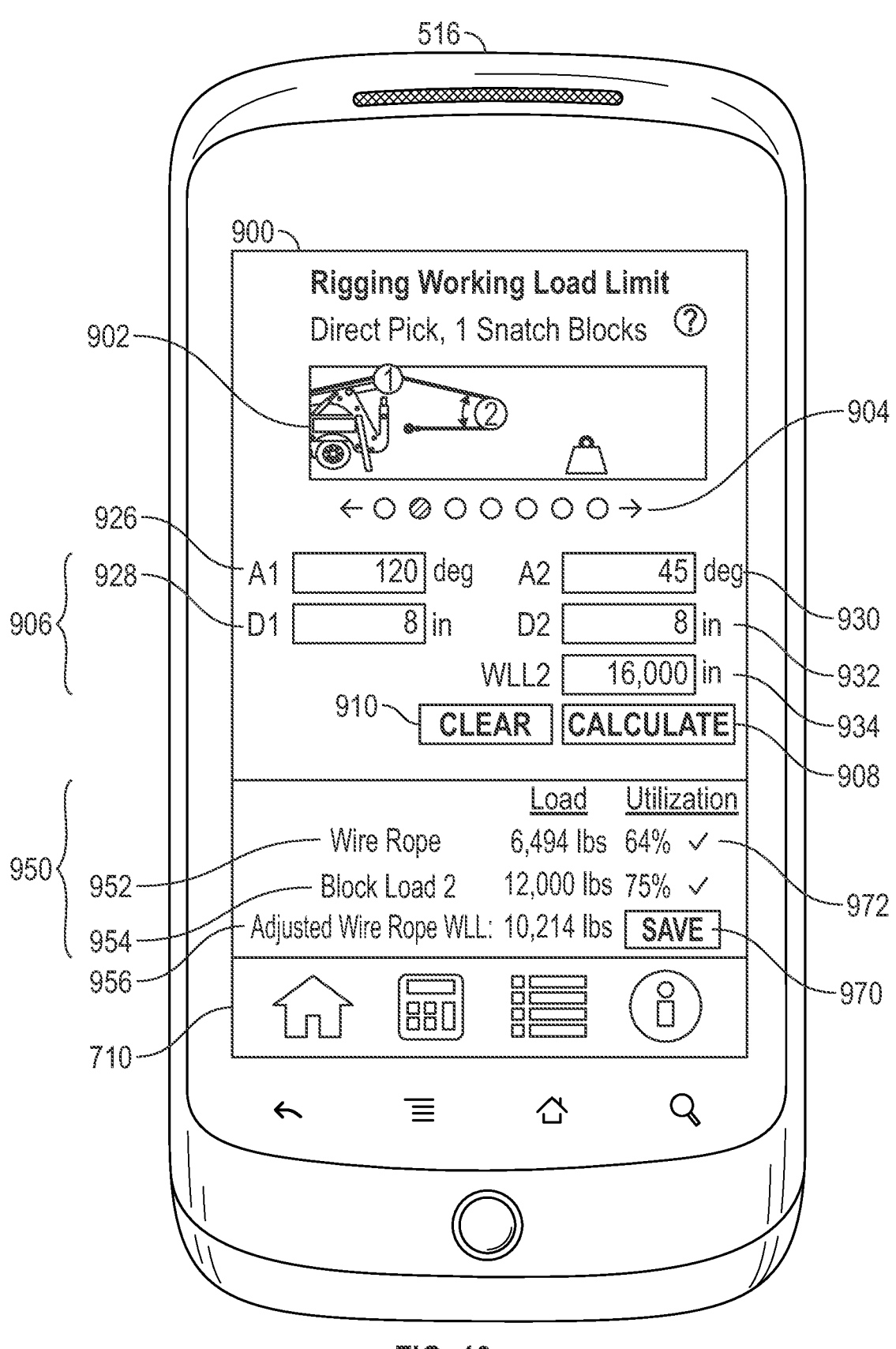
FIG. 10 is a diagram of a user device of a vehicle management system of FIG. 5, displaying a fourth graphical user interface (GUI), according to an exemplary embodiment.

According to the exemplary embodiment shown in FIG. 10, the rigging WLL interface 900 includes a results block, shown as rigging WLL results block 950. According to an exemplary embodiment, after the rigging information block 906 is populated, and the calculate icon 908 is selected, the rigging setup data is processed (and returned) to be displayed in the rigging WLL results block 950. Similar to the towing performance results discussed above in FIGS. 7-8, the data in the rigging information block 906 is communicated to the user device 516, processed using the components of the user device 516, communicated back to the user application 518, and/or displayed in the rigging WLL results block 950. In some embodiments, the data in the rigging information block 906 is communicated to an external device (e.g., the controller 502, the vehicle sensor 514, the network 520), processed (e.g., via the rigging load circuit 582, etc.), and communicated to the user application 518 (e.g., the user device 516) in the form of results data, which may be displayed in the rigging WLL results block 950. For example, the user application 518 may communicate rigging setup data (e.g., data in the rigging information block 906) to the rigging load circuit 582 via the communications interface 512, the rigging load circuit 582 may process the data, and may communicate the rigging load output (e.g., results) data back to the user application 518 via the communications interface 512. The rigging load output (e.g. results) data may then be displayed in the rigging WLL results block 950 of the rigging WLL interface 900.

As shown in FIG. 10, the rigging WLL results block 950 also includes several results icons, for example a line load icon 952, a block load icon 954, and an adjusted line working load limit icon 956 (hereinafter, "adjusted line WLL icon 956"). According to an exemplary embodiment, the line load icon 952 indicates the amount of tension in the line 154. The block load icon 954 may indicate the force applied at a location by a snatch block 130. In an exemplary embodiment, the adjusted line WLL icon 956 indicates the working load limit of the line 154 after the line 154 has been rigged, as discussed above. It should be understood that while only certain icons are shown in the rigging WLL results block 950, fewer, additional, and/or different icons may be displayed in the rigging WLL results block 950, which may relate to the rigging setup that is selected. For example, if a rigging setup is selected that utilizes an indirect pick on the vehicle, and three snatch blocks 130, additional icons (e.g., a second block load icon 962, a third block load icon 964, etc.) may be included. In some embodiments, the rigging WLL results block 950 also includes additional icons, for example, a line utilization icon 958 (e.g., indicating the percentage of the line 154 working load limit that is being used by the line 154), a block utilization icon 960 e.g., indicating the percentage of the snatch block 130 working load limit that is being used by the snatch block 130 at a particular location), and/or any number of additional icons that relate to the selected rigging setup. Similar to the rigging information block 906, the rigging WLL results block 950 may include any suitable icon, for example an automatic output block, a button, a slide bar, a column, etc.

As shown in FIG. 10, the rigging WLL interface 900 also includes a save icon 970. After the rigging WLL results block 950 has been populated, the save icon 970 may be selected, and the rigging data may be saved (e.g., in the user application 518, the user device 516, the memory device 508 of the controller 502, an external device, etc.) to view, modify, replicate, analyze, process, etc. In an exemplary embodiment, the rigging WLL interface 900 also includes an acceptable rigging icon 972 and/or an error icon 974, which indicate whether the rigging setup results are within acceptable thresholds. For example, if all the rigging utilization components (e.g., the line utilization icon(s) 958, the block utilization(s) icon 960, etc.) are under a threshold (e.g., one hundred percent), the acceptable rigging icon 972 may be displayed. Conversely, if any rigging utilization component is over the threshold, the error icon 974 may be displayed. According to an exemplary embodiment, the acceptable rigging icon 972 and/or the error icon 974 are any suitable icons to communicate whether the rigging setup results are within acceptable thresholds, for example, a green checkmark, a red "X", an error message (as discussed above), etc.

According to the exemplary embodiment shown in FIG. 11, a process 1100 for providing a tow performance is shown. According to an exemplary embodiment, the process 1100 is executed using the components of the VMS 500 of FIG. 5 (e.g., the controller 502, the user device 516, the user application 518, the vehicle sensor 514, etc.), and/or the interfaces of the user application 518 (e.g., the GUIs) discussed in FIGS. 6-10.

At step 1102 tow performance data is obtained, according to an exemplary embodiment. In an exemplary embodiment, the tow performance data includes vehicle data (e.g., the properties of the wheelbase of the vehicle, the overhang properties of the vehicle, the weight ratings of the axles, other properties of the axles, etc.), platform 114 data, wheel data, load resistance data, and/or any other suitable data relating to a tow performance. The tow performance data may be obtained from any suitable source. For example, the tow performance data may be obtained from a user (e.g., via a touch screen, manually input into the user application 518 via the user device 516, automatically input into the user application 518 via capturing an image and/or video of the vehicle with the user device 516, etc.), a sensor (e.g., the vehicle sensor 514, etc.), an external device (e.g., the network 520, the server 522, the user device 516, etc.), and/or components of a vehicle monitoring system (e.g., the VMS 500 components, the circuits 550-586 of the control system 510, the processor 506, the memory device 508, etc.).

At step 1104, a tow performance load is determined, according to an exemplary embodiment. In an exemplary embodiment, the tow performance load is determined as the heaviest load a vehicle may lift while maintaining a steer axle utilization (e.g., a desired percentage of the weight to remain on the towing vehicle's steer axle when a load is lifted) at a given overhang length. The tow performance load may be determined using the user application 518 (e.g., determined in the user application 518 via the components of the user device 516, input into the user application 518 via a user, etc.), components of the VMS 500 (e.g., the circuit(s) 550-586, the network 520, the server 522, etc.), and/or any other suitable device. In some embodiments, the tow performance load is automatically determined, for example based on certain tow performance data obtained at step 1102.

At step 1106, a first tow performance state is determined, according to an exemplary embodiment. In an exemplary embodiment, the first tow performance state is a steer axle utilization state, for example a remaining steer axle utilization state. The steer axle utilization state may be determined as the percentage of a load that remains on the steer axle after lifting the tow performance load (e.g., determined at step 1104). According to an exemplary embodiment, the first tow performance state is determined using the user application 518 (e.g., via the components of the user device 516), and/or other components of the VMS 500 (e.g., the towing load circuit 580, components of the controller 502, the processor 506, the network 520, etc.). In some embodiments, the first tow performance state is automatically determined, for example based on certain tow performance data obtained at step 1102. It should also be understood that in other embodiments, the first tow performance state is any other suitable vehicle component (or load) state and/or property relating to a tow performance. For example, an axle weight (e.g., steer axle weight, drive axle weight, etc.), an axle weight rating (e.g., steer axle weight rating, drive axle weight rating, etc.), the platform 114 properties (e.g., weight rating, position, load on support members, etc.), wheel properties (e.g., aligned, locked, positioning, etc.), the winch 150 properties (e.g., weight rating, drive mechanism properties, properties of the winch itself, e.g., the drum, etc.), and/or any other suitable vehicle component state and/or property relating to a tow performance.

At step 1108, a second tow performance state is determined, according to an exemplary embodiment. In an exemplary embodiment, the second tow performance state is a drive axle utilization state, for example a loaded drive axle utilization state. The drive axle utilization state may be determined as the percentage of the drive axle weight rating (e.g., the weight capacity of the drive axle according to the manufacturer) being used by the drive axle after lifting the tow performance load (e.g., determined at step 1104). According to an exemplary embodiment, the second utilization state is determined using the user application 518 (e.g., via the components of the user device 516), and/or other components of the VMS 500 (e.g., the towing load circuit 580, the controller 502, the processor 506, the network 520, etc.). In yet other embodiments, the second tow performance state is automatically determined, for example based on certain tow performance data obtained at step 1102. Like the first tow performance state, in other embodiments, the second tow performance state is any other suitable vehicle component (or load) state and/or property relating to a tow performance (e.g., vehicle properties, axle properties, platform 114 properties, wheel properties, boom 126 properties, cross bar 128 properties, winch 150 properties, etc.).

At step 1110, the first tow performance state is compared to a first tow performance threshold, according to an exemplary embodiment. In an exemplary embodiment, the first tow performance state (e.g., the steer axle utilization, etc.), determined at step 1106, is compared to the first tow performance threshold (e.g., fifty percent). According to an exemplary embodiment, the first tow performance threshold relates (e.g., correspond) to a threshold of the first tow performance state (e.g., axle properties, vehicle properties, etc.). The first tow performance threshold may be provided from any suitable source. For example, a user (e.g., via a touch screen, input into the user application 518 via the user device 516, etc.), an external device (e.g., the network 520, the server 522, the user device 516, etc.), components of a vehicle monitoring system (e.g., the VMS 500, the circuits 550-586 of the control system 510, processor 506, memory device 508, etc.), etc. Further, the first tow performance threshold may be determined based on any number of suitable characteristics and/or factors, for example user preferences, vehicle specifications, regulatory requirements, safety requirements, etc.

At step 1112, the second tow performance state is compared to a second tow performance threshold, according to an exemplary embodiment. In an exemplary embodiment, the second tow performance state (e.g., the drive axle utilization), determined at step 1108, is compared to the second tow performance threshold (e.g., one hundred percent). Similar to the first tow performance threshold, the second tow performance threshold may relate (e.g., correspond) to a threshold for the second tow performance state (e.g., axle properties, vehicle properties, etc.), may be provided from any suitable source (e.g., the user application 518, the user device 516, the controller 502, etc.), and/or may be determined based on any suitable factor(s) (e.g., user preferences, vehicle specifications, safety requirements, etc.).

At step 1114, it is determined whether to provide an indication of an acceptable tow performance, according to an exemplary embodiment. According to an exemplary embodiment, if it is determined that the first tow performance state is above/below the first tow performance threshold (e.g., at step 1110), and/or the second tow performance state is above/below the second tow performance threshold (e.g., at step 1112), an indication of an acceptable tow performance (or an error message) is provided. For example, if it is determined that the first tow performance state is above the first tow performance threshold at step 1110 (e.g., the steer axle utilization is above fifty percent), and that the second tow performance state is below the second tow performance threshold at step 1112 (e.g., the drive axle utilization is below one hundred percent), an indication of an acceptable tow performance may be provided. Conversely, if the first tow performance state is below the first tow performance threshold at step 1110 (e.g., the steer axle utilization is below fifty percent), or the second tow performance state is above the second tow performance threshold at step 1112 (e.g., the drive axle utilization is above one hundred percent), no indication of an acceptable tow performance (or an error message) may be provided. According to an exemplary embodiment, the indication is visual (e.g., a symbol displayed in the user application 518, a user interface, etc.), audio, tactile, and/or any other suitable indicator. In some embodiments, based on the determination at step 1114, a user is further permitted, or not permitted, to perform a tow performance. For example, if a determination is made that the tow performance parameters are not acceptable, the user device 516 (e.g., the user application 518), the controller 502 (e.g., the processing circuit 504, the control system 510, etc.), the network 520, and/or the server 522 may not permit the user (e.g., vehicle) to complete the tow performance.

According to the exemplary embodiment shown in FIG. 12, a process 1200 for providing a rigging setup is shown. According to an exemplary embodiment, the process 1200 is executed using the components of the VMS 500 of FIG. 5 (e.g., the controller 502, the user device 516 and the user application 518, the vehicle sensor 514, etc.), and/or the interfaces of the user application 518 (e.g., the GUIs) discussed in FIGS. 6-10.

At step 1202 rigging setup data is obtained, according to an exemplary embodiment. In an exemplary embodiment, the rigging setup data includes resistance properties of a load (e.g., a resistance of a casualty or load, adjusted resistance properties, etc.), properties of the line 154 (e.g., material, diameter, working load limit, etc.), properties of the snatch block(s) 130 (e.g., number of snatch block(s) 130, working load limit, properties of the sheave wheel(s) at the snatch block(s) 130, angle(s) of the line 154 as the line 154 enters/exits the snatch block(s) 130, etc.), vehicle data, platform 114 data, wheel data, and/or any other suitable data relating to a rigging setup. The rigging setup data may be obtained from any suitable source, for example from a user (e.g., via a touch screen, manually input into the user application 518 via the user device 516, automatically input into the user application 518 via capturing an image or video of the vehicle with the user device 516, etc.), a sensor (e.g., the vehicle sensor 514), and/or components of a vehicle monitoring system (e.g., the VMS 500, the circuits 550-586 of the control system 510, the processor 506, the memory device 508, etc.).

At step 1204, a rigging load is determined, according to an exemplary embodiment. In an exemplary embodiment, the rigging load is determined as the force needed to lift or pull a load (i.e., a casualty). The rigging load may be determined using the user application 518 (e.g., via the components of the user device 516, input into the user application 518 via a user, etc.), components of the VMS 500 (e.g., the circuits 550-586, the network 520, the server 522, etc.), and/or any other suitable device. In other embodiments, the rigging load is automatically determined, for example based on certain rigging setup data obtained at step 1202.

At step 1206, a first rigging performance state is determined, according to an exemplary embodiment. In an exemplary embodiment, the first rigging performance state is a line utilization state. The line utilization state may be determined as the percentage of the line 154 working load limit that is being used by the line load (i.e., the amount of tension in the line 154). (The amount of line load may be determined as the amount of tension applied to the line 154 when the rigging load, determined at step 1204, is lifted and the mechanical advantage of the snatch block(s) 130 is/are accounted for, as discussed above.) According to an exemplary embodiment, the first rigging performance state is determined using the user application 518 (e.g., via the components of the user device 516, input into the user application 518, etc.), and/or other components of the VMS 500 (e.g., the rigging load circuit 582, the controller 502, the processor 506, the network 520, etc.). In some embodiments, the first rigging performance state is automatically determined, for example based on certain rigging setup data obtained at step 1202. It should also be understood that in other embodiments, the first rigging performance state is any other suitable vehicle component (or load) state and/or property relating to a rigging setup. For example, the line 154 properties (e.g., material, diameter, working load limit, etc.), properties of the snatch block(s) 130 (e.g., number of snatch block(s) 130, working load limit, properties of the sheave wheel(s) at the snatch block(s) 130, angle(s) of the line 154 as the line 154 enters/exits the snatch block(s) 130, etc.), the platform 114 properties, the boom 126 properties, the cross bar 128 properties, the winch 150 properties, and/or any other suitable vehicle component or load state and/or property relating to a rigging setup.

At step 1208, a second rigging performance state is determined, according to an exemplary embodiment. In an exemplary embodiment, the second rigging performance state is a first snatch block utilization state. The first snatch block utilization state may be determined as the percentage of a first snatch block's working load limit being used by a first block load. (The first block load may be the force applied to a first location by the attached first snatch block, as discussed above.) Like the first rigging performance state, the second rigging performance state may be determined using the user application 518 (e.g., via components of the user device 516, input into the user application 518, etc.), and/or other components of the VMS 500 (e.g., the rigging load circuit 582, the controller 502, the processor 506, the network 520, etc.). In other embodiments, the second rigging performance state is automatically determined, for example based on rigging setup data obtained at step 1202. Also like the first rigging performance state, in other embodiments the second rigging performance state is another suitable vehicle component (or load) state and/or property relating to a rigging setup. For example, the properties of the line 154, the snatch block(s) 130, the platform 114, the boom 126, the cross bar 128, the winch 150, etc.

At step 1210, the first rigging performance state is compared to a first rigging threshold, according to an exemplary embodiment. In an exemplary embodiment, the first rigging performance state (e.g., the line utilization, etc.), determined at step 1206, is compared to the first rigging threshold (e.g., one hundred percent). According to an exemplary embodiment, the first rigging threshold relates (e.g., corresponds) to a threshold of the first rigging performance state (e.g., the line 154 properties, innate properties, etc.). The first rigging threshold may be provided from any suitable source, for example a user (e.g., via a touch screen, input into the user application 518 via the user device 516, etc.), an external device (e.g., the network 520, the server 522, the user device 516, etc.), components of a vehicle monitoring system (e.g., the VMS 500, the circuits 550-586 of the control system 510, processor 506, memory device 508, etc.), etc. Furthermore, the first rigging threshold may be determined based on any number of suitable characteristics and/or factors, for example user preferences, vehicle specifications, regulatory requirements, safety requirements, etc.

At step 1212, the second rigging performance state is compared to a second rigging threshold, according to an exemplary embodiment. In an exemplary embodiment, the second rigging performance state (e.g., the first snatch block utilization state), determined at step 1208, is compared to the second rigging threshold (e.g., one hundred percent). Similar to the first rigging threshold, the second rigging threshold may relate (e.g., correspond) to a threshold for the second rigging performance state (e.g., snatch block(s) 130 utilization(s)). Moreover, like the first rigging threshold, the second rigging threshold may be provided from any suitable source (e.g., the user application 518, the user device 516, the controller 502, etc.), and/or may be determined based on any suitable characteristic(s) and/or factor(s) (e.g., user preferences, vehicle specifications, safety requirements, etc.).

At step 1214, it is determined whether to provide an indication of an acceptable rigging setup, according to an exemplary embodiment. In an exemplary embodiment, if it is determined that the first rigging performance state is above/below the first rigging threshold (e.g., at step 1210), and/or the second rigging performance state is above/below the second rigging threshold (e.g., at step 1212), an indication of an acceptable rigging setup (or an error message) is provided. For example, if it is determined that the first rigging performance state is below the first rigging threshold at step 1210 (e.g., the line utilization is below one hundred percent), and the second rigging performance state is below the second rigging threshold at step 1212 (e.g., the first snatch block utilization state is below one hundred percent), an indication of an acceptable rigging setup may be provided. Conversely, if the first rigging performance state is above the first rigging threshold, or the second rigging performance state is above the second rigging threshold, no indication of an acceptable rigging setup (or an error message) may be provided. Like the indications discussed above, in an exemplary embodiment the indication may be visual (e.g., a symbol in the user application 518, etc.), audio, tactile, and/or another suitable indicator. In some embodiments, at step 1114, the user is further permitted, or not permitted, to perform a rigging setup. For example, if a determination is made that a rigging setup is not within acceptable thresholds, the user device 516 (e.g., the user application 518), the controller 502 (e.g., the processing circuit 504, the control system 510, etc.), the network 520, and/or the server 522 may not permit the user (e.g., the vehicle) to complete the rigging setup or performance.

According to an exemplary embodiment, based on the rigging setup a user is utilizing, the steps of the process 1200 are repeated for additional vehicle components, and/or additional steps are added to the process 1200. In an exemplary embodiment, and as discussed above with regard to the different rigging setups in the rigging WLL interface 900 of FIGS. 9-10, if a rigging setup is selected that utilizes an indirect pick on the vehicle, and three snatch blocks 130, additional rigging performance states (or properties) are determined, as well as, compared to additional thresholds. For example, a third rigging performance state may be determined (e.g., a second snatch block utilization state), and may be compared to a third rigging threshold (e.g., one hundred percent). Further, a fourth rigging performance state may be determined (e.g., a third snatch block utilization state), and may be compared to a fourth rigging threshold (e.g., one hundred percent). In an exemplary embodiment, these additional determinations and comparisons are also be included in step 1214, where a determination is made whether to provide an acceptable rigging setup indication. This process may be repeated for as many vehicle components and/or properties as may be needed to resemble the rigging setup the user is utilizing.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

While various circuits with particular functionality are shown in FIG. 5, it should be understood that the controller 502 may include any number of circuits for completing the functions described herein. For example, the activities and functionalities of the circuits 550-586 may be combined in multiple circuits or as a single circuit. Additional circuits with additional functionality may also be included. Further, the controller 502 may further control other activity beyond the scope of the present disclosure.

As mentioned above and in one configuration, the "circuits" may be implemented in machine-readable medium for execution by various types of processors, such as the processor 506 of FIG. 5. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A wrecker vehicle comprising:
a chassis having a frame, the chassis coupled with a plurality of wheels;
a boom coupled with the chassis, the boom having a line configured to engage one or more sheave blocks to position a piece of equipment relative to the chassis;
a hoist device coupled with the chassis, the hoist device configured to engage the line to position the piece of equipment relative to the chassis; and
a controller configured to:
    receive rigging setup data relating to at least one of a configuration of the boom, a characteristic of the line, or a characteristic of the piece of equipment;
    determine a rigging load based on the rigging setup data;
    determine a first utilization state based on the rigging load, wherein the first utilization state is a line load utilization state of the line;
    determine a second utilization state based on the rigging load, wherein the second utilization state is a first block load utilization state of a first sheave block;
    determine, based on a comparison of the first utilization state to a first threshold and the second utilization state to a second threshold, a rigging setup state; and
    provide an indication of the rigging setup state.

2. The wrecker vehicle of claim 1, wherein the rigging setup data includes at least one of a diameter of the line, a working load limit of the line, a first angle of the line at the first sheave block, and a diameter of the first sheave block.

3. The wrecker vehicle of claim 1, wherein in response to the first utilization state being below the first threshold and the second utilization state being below the second threshold, the indication is an alert indicating a portion of the piece of equipment is permitted to be loaded on the chassis.

4. The wrecker vehicle of claim 3, wherein the first threshold and the second threshold are the same.

5. The wrecker vehicle of claim 3, wherein the first threshold and the second threshold are different.

6. The wrecker vehicle of claim 1, wherein in response to the first utilization state being above the first threshold or the second utilization state being above the second threshold, the indication is an error message indicating a portion of the piece of equipment is not permitted to be loaded onto the chassis.

7. The wrecker vehicle of claim 6, wherein the first threshold and the second threshold are the same.

8. The wrecker vehicle of claim 6, wherein the first threshold and the second threshold are different.

9. The wrecker vehicle of claim 1, wherein the controller is communicably coupled with a user device, and wherein the controller is further configured to provide a display of the indication of the rigging setup state to the user device.

10. The wrecker vehicle of claim 1, wherein the indication is at least one of a tactile indication, a visual indication, and an audible indication.

11. The wrecker vehicle of claim 1, wherein the controller is configured to receive the rigging setup data via one or more sensors coupled with the boom, wherein the one or more sensors are configured to determine least one of the configuration of the boom or the characteristic of the line.

12. The wrecker vehicle of claim 1, wherein the controller is communicably coupled with a user device, and wherein the controller is configured to receive the rigging setup data from the user device.

13. The wrecker vehicle of claim 12, wherein the controller is further configured to extract the rigging setup data from a visual media capture via the user device.

14. The wrecker vehicle of claim 1, wherein the controller is further configured to determine a third utilization state based on the rigging load, wherein the third utilization state is a second block load utilization state of a second sheave block.

15. The wrecker vehicle of claim 14, wherein the controller is further configured to determine, based on a comparison of the third utilization state to a third threshold, the rigging setup state, and wherein in response to the third utilization state being above the third threshold, the indication is an error message.

16. A wrecker vehicle monitoring system, comprising:
one or more processing circuits comprising one or more memory devices coupled to one or more processors, the one or more memory devices configured to store instructions thereon that, when executed by the one or more processors, cause the one or more processors to perform operations comprising:
receiving rigging setup data relating to at least one of a configuration of a boom, a characteristic of a line, or a characteristic of a piece of equipment;
determining a rigging load based on the rigging setup data;

determining a first utilization state based on the rigging load, wherein the first utilization state is a line load utilization state of the line;
determining a second utilization state based on the rigging load, wherein the second utilization state is a first block load utilization state of a first sheave block;
determining, based on a comparison of the first utilization state to a first threshold and the second utilization state to a second threshold, a rigging setup state; and
providing an indication of the rigging setup state.

17. The wrecker vehicle monitoring system of claim 16, wherein in response to the first utilization state being below the first threshold and the second utilization state being below the second threshold, the indication is an alert indicating a portion of the piece of equipment is permitted to be loaded onto a wrecker vehicle.

18. The wrecker vehicle monitoring system of claim 16, wherein in response to the first utilization state being above the first threshold or the second utilization state being above the second threshold, the indication is an error message indicating a portion of the piece of equipment is not permitted to be loaded onto a wrecker vehicle.

19. A method, comprising:
receiving rigging setup data, the rigging setup data relating to at least one of a configuration of a boom, a characteristic of a line, or a characteristics of a piece of equipment;
determining a rigging load based on the rigging setup data;
determining a first utilization state based on the rigging load, wherein the first utilization state is a line load utilization state of the line;
determining a second utilization state based on the rigging load, wherein the second utilization state is a first block load utilization state of a first sheave block;
determining, based on a comparison of the first utilization state to a first threshold and the second utilization state to a second threshold, a rigging setup state; and
providing an indication of the rigging setup state.

20. The method of claim 19, wherein responsive to determining the first utilization state is below the first threshold and the second utilization state being is the second threshold, the indication is an alert indicating a portion of the piece of equipment is permitted to be loaded onto a wrecker vehicle.

* * * * *